United States Patent
Harano

(10) Patent No.: US 9,373,068 B2
(45) Date of Patent: Jun. 21, 2016

(54) PRINTING APPARATUS, METHOD AND NON-TRANSITORY COMPUTER-READABLE MEDIUM FOR RECEIVING PRINT JOBS INCLUDING A COMMAND TO PROCESS SUBSEQUENT PRINT JOB

(71) Applicant: CANON KABUSHIKI KAISHA, Tokyo (JP)

(72) Inventor: Yuzo Harano, Sahamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/448,858

(22) Filed: Jul. 31, 2014

(65) Prior Publication Data

US 2015/0036171 A1 Feb. 5, 2015

(30) Foreign Application Priority Data

Aug. 2, 2013 (JP) .................................. 2013-161459

(51) Int. Cl.
*G06K 15/00* (2006.01)
*G03G 15/00* (2006.01)

(52) U.S. Cl.
CPC .......... *G06K 15/408* (2013.01); *G03G 15/5012* (2013.01); *G06K 15/002* (2013.01); *G03G 15/5016* (2013.01)

(58) Field of Classification Search
None
See application file for complete search history.

(56) References Cited

U.S. PATENT DOCUMENTS

| | | | |
|---|---|---|---|
| 2005/0052679 A1* | 3/2005 | Green et al. | 358/1.14 |
| 2006/0028672 A1 | 2/2006 | Abiko | |
| 2006/0127121 A1* | 6/2006 | Ueda et al. | 399/82 |
| 2010/0245899 A1* | 9/2010 | Hirama | 358/1.15 |
| 2010/0302574 A1* | 12/2010 | Okada | 358/1.14 |
| 2011/0249290 A1* | 10/2011 | Hayber et al. | 358/1.15 |
| 2011/0255120 A1 | 10/2011 | Hirahara | |
| 2012/0314249 A1 | 12/2012 | Poxon | |

FOREIGN PATENT DOCUMENTS

| | | |
|---|---|---|
| CN | 1306907 A | 8/2001 |
| CN | 102935766 A | 2/2013 |
| JP | 2008-188775 A | 8/2008 |
| JP | 2010-277311 A | 12/2010 |

* cited by examiner

*Primary Examiner* — Benny Q Tieu
*Assistant Examiner* — Haris Sabah
(74) *Attorney, Agent, or Firm* — Canon U.S.A., Inc. IP Division

(57) ABSTRACT

When a printing apparatus starts job processing by acquiring a job in which an execution order is set thereto, the printing apparatus generates printable image data by analyzing the acquired job. In this period, the printing apparatus determines whether an error has occurred in a job processing period. In a case where the printing apparatus determines that the error has occurred in the job processing period, the printing apparatus stops the processing of the started job, and controls the processing of a subsequent job to stop or continue according to an instruction of a user.

10 Claims, 15 Drawing Sheets

FIG. 3

301 PRINT JOB MANAGEMENT TABLE

| PRINT JOB NAME | EXECUTION ORDER | PROCESSING STATUS | CANCELLATION REASON | PRINT OUTPUT ORDER |
|---|---|---|---|---|
| PRINT JOB | 1 | OK | – | 1 |
| PRINT JOB | 2 | CANCELED | OPERATOR'S INSTRUCTION | – |
| PRINT JOB | 3 | OK | – | 2 |
| PRINT JOB | 4 | CANCELED | RIP ERROR | – |
| PRINT JOB | 5 | OK | – | 3 |

401 PRINT JOB MANAGEMENT TABLE

| PRINT JOB NAME | EXECUTION ORDER | PROCESSING STATUS | CANCELLATION REASON | PRINT OUTPUT ORDER |
|---|---|---|---|---|
| PRINT JOB | 1 | OK | — | 1 |
| PRINT JOB | 2 | CANCELED | OPERATOR'S INSTRUCTION | UNPRINTED |
| PRINT JOB | 3 | STOPPED | — | UNPRINTED |
| PRINT JOB | 4 | STOPPED | — | UNPRINTED |
| PRINT JOB | 5 | STOPPED | — | UNPRINTED |

501 PRINT JOB MANAGEMENT TABLE

| PRINT JOB NAME | EXECUTION ORDER | PROCESSING STATUS | CANCELLATION REASON | PRINT OUTPUT ORDER |
|---|---|---|---|---|
| PRINT JOB | 1 | OK | - | 1 |
| PRINT JOB | 2 | CANCELED | OPERATOR'S INSTRUCTION | UNPRINTED |
| PRINT JOB | 3 | OK | - | 2 |
| PRINT JOB | 4 | CANCELED | RIP ERROR | UNPRINTED |
| PRINT JOB | 5 | STOPPED | - | UNPRINTED |

502
503
504
505
506

PRINTING APPARATUS, METHOD AND NON-TRANSITORY COMPUTER-READABLE MEDIUM FOR RECEIVING PRINT JOBS INCLUDING A COMMAND TO PROCESS SUBSEQUENT PRINT JOB

BACKGROUND OF THE INVENTION

1. Field of the Invention

The present invention relates to a printing apparatus, a control method for the printing apparatus, and a program therefor.

2. Description of the Related Art

Conventionally, a printing apparatus has been provided with functions for executing various kinds of processing on a print job, and a function for cancelling the print job and a technique therefor have been known (for example, please see Japanese Patent Application Laid-Open No. 2008-188775 and Japanese Patent Application Laid-Open No. 2010-277311). Generally, the print job may be intentionally cancelled by a user as an operator of the printing apparatus, or automatically cancelled by the printing apparatus because of some error arising in the printing apparatus. In any of the above cases, because the printing apparatus regards the operation as a valid cancellation, the print job comes into a normal ending state, so that the printing processing will proceed to a next print job in a case where there is another print job following thereafter.

As one usage of the printing apparatus, there may be a case where the operator executes printing by combining a plurality of print jobs and acquires one printing outcome by consolidating the printing outputs thereof. In this case, the printing apparatus has to accomplish the printing processing and outputs thereof according to the order of the print jobs instructed by the operator.

However, in the course of execution of a plurality of print jobs, if one job is cancelled because of some error, so that the processing automatically proceeds to a subsequent job, the subsequent job may be eventually processed ahead of the cancelled print job in the case where the cancelled print job is partially performed or re-issued. If the printing apparatus does not process the print job according to the order instructed by the operator, a printing output thereof will not be processed in the printing order desired by the operator, and thus the printing output cannot be regarded as a printing outcome. Therefore, the conventional technique cannot be employed because such a printing result can be a critical problem particularly in the field of commercial printing where the printing outcome is considered to be a product that is to be delivered to a print-ordering party.

SUMMARY OF THE INVENTION

It is desirable to provide a system capable of executing specific processing intended by a user on a subsequent job even in a case where one job for which an execution order is specified has been stopped.

A printing apparatus according to the present invention includes the following configurations. The printing apparatus includes an acquisition unit configured to acquire a job in which an execution order is set thereto, a processing unit configured to process the job acquired by the acquisition unit, a determination unit configured to determine whether an error has occurred when the job is being processed by the processing unit, and a control unit configured to stop the processing of the job started by the processing unit and control the processing of a subsequent job to stop or continue according to an instruction of a user in a case where it is determined that an error has occurred in a processing period of the job.

Further features of the present invention will become apparent from the following description of exemplary embodiments with reference to the attached drawings.

BRIEF DESCRIPTION OF THE DRAWINGS

FIG. 3 is an explanatory diagram of a print job management table managed by the printing apparatus.

FIG. 4 is an explanatory diagram of a print job management table managed by the printing apparatus.

FIG. 5 is an explanatory diagram of a print job management table managed by the printing apparatus.

DESCRIPTION OF THE EMBODIMENTS

Various exemplary embodiments, features, and aspects of the invention will be described in detail below with reference to the drawings.

<Description of System Configuration>

Figure 1:
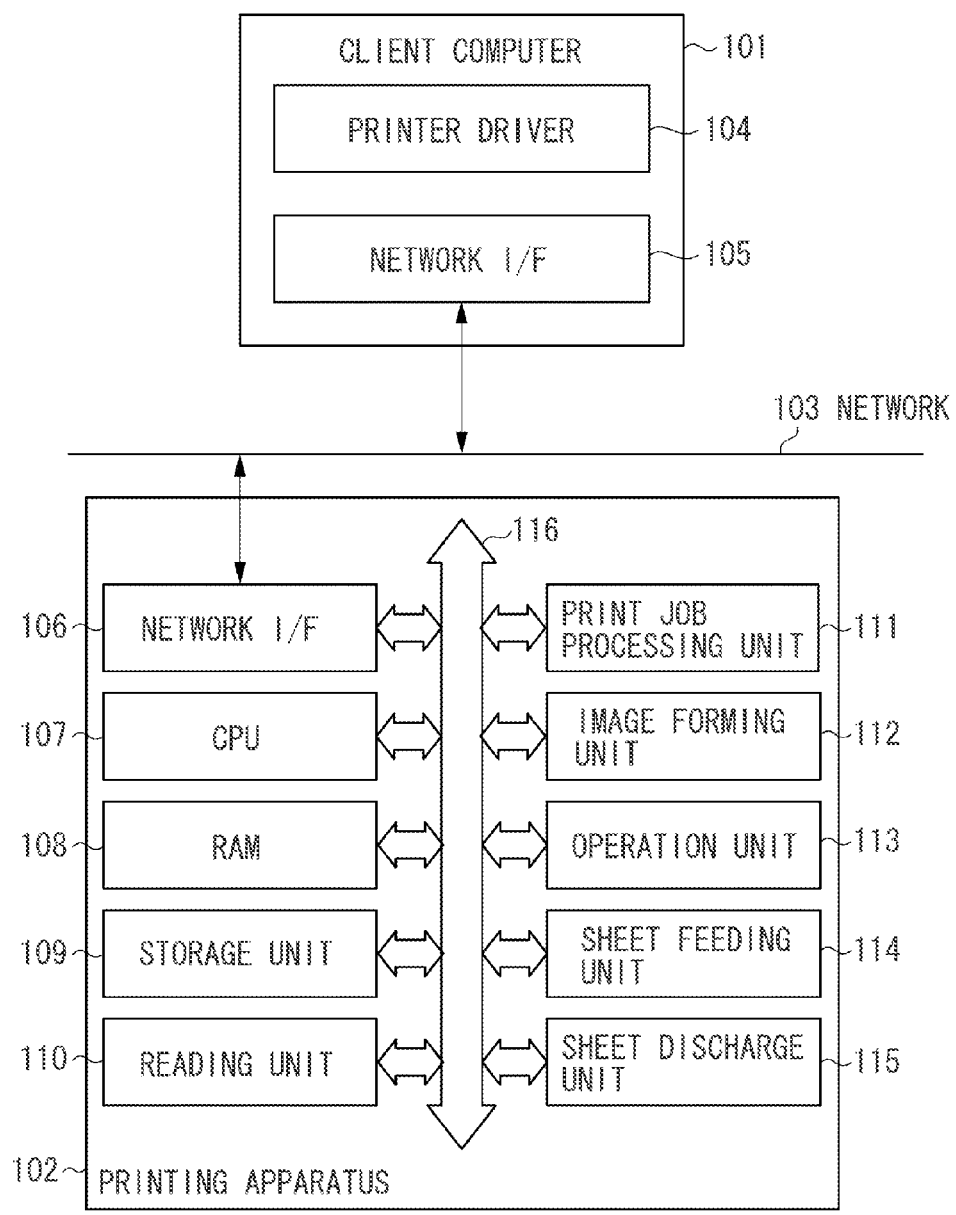
FIG. 1 is a block diagram illustrating a configuration of a printing system.

FIG. 1 is a block diagram illustrating a configuration of a printing system including a printing apparatus according to a first exemplary embodiment. The printing system may be configured of either a single device or a plurality of devices as long as the printing system can execute functions such as printing processing. Further, the printing system may execute the processing by connecting a plurality of devices to each other via a network such as a local area network (LAN) or a wide area network (WAN). An exemplary printing system configured of various terminals connected to each other will be described below though various configuration examples can be provided according to the use and the purpose thereof.

The printing system is configured of a client computer 101, a printing apparatus 102, and a network 103.

A printer driver 104 is installed in the client computer 101, so that the client computer 101 is connected to the network 103 via a network interface (I/F) 105. In the present exemplary embodiment, the client computer 101 will be described as a personal computer (PC). The printer driver 104 is software operating on an operating system (OS) that controls the client computer 101.

Further, according to a printing instruction from an application, the printer driver 104 transmits printing data to the printing apparatus 102 as a print job by expressing the printing data in a page description language (PDL). The network interface (I/F) 105 connects to and communicates with an external device via the network 103, and executes communication control processing on the network 103. For example, the network I/F 105 can execute the internet communication using a transmission control protocol/internet protocol (TCP/IP) method, or can transmit and receive data to and from the printing apparatus 102.

Generally, for example, the PC includes a central processing unit (CPU), a hard disk drive (HDD), a random access memory (RAM), and various input-output devices. However, descriptions thereof will be omitted because they are devices for general purpose use.

The printing apparatus 102 includes a network I/F 106, a CPU 107, a RAM 108, a storage unit 109, a reading unit 110, a print job processing unit 111, an image forming unit 112, and an operation unit 113. Further, the printing apparatus 102 includes a sheet feeding unit 114 for feeding a sheet, and a sheet discharge unit 115 for discharging a processed sheet on which an image is formed.

Furthermore, each of these units is connected to each other via a system bus 116. In the present exemplary embodiment, the printing apparatus 102 will be described as a multifunction peripheral (MFP) operating as a copier, a printer, and a facsimile (FAX). The network I/F 106 connects to and communicates with an external device via the network 103, and executes the communication control processing on the network 103.

For example, the network I/F 106 can execute the internet communication using a TCP/IP method, or can transmit and receive data to/from the client computer 101. The CPU 107 executes various kinds of processing such as arithmetic processing, information processing, and device control processing with various programs stored in the storage unit 109 of the printing apparatus 102. The programs are to be loaded on the RAM 108. The RAM 108 is a kind of general volatile storage device the CPU 107 can access directly, which is used as a work area of the CPU 107 or a temporary data storage area.

The storage unit 109 temporarily or permanently stores a print job received from the client computer 101. In the present exemplary embodiment, the storage unit 109 will be described by taking the HDD as an example. The reading unit 110 reads a paper document through an optical method. In the present exemplary embodiment, the reading unit 110 as a scanner will be described. The scanner includes a document illumination lamp and a scanning mirror, and optically scans a document placed on a document positioning glass plate. The light reflected from the document is introduced to a lens through the scanning mirror and a reflection mirror, so that an optical signal that has passed through the lens is introduced to a solid-state image sensor. The optical signal is converted to an electric signal by the solid-state image sensor, so as to be recognized as an image signal.

In addition, for example, the solid-state image sensor may be a charge coupled device (CCD) type or a complementary metal oxide semiconductor (CMOS) type image sensor. The print job processing unit 111 processes a print job of a copy, a PDL, or a FAX to generate print image data, and transfers the print image data to the below-described image forming unit 112.

Further, the page description language is a language for describing a command for controlling a page printer, represented by a post script (PS) or a printer control language (PCL). The print job processing unit 111 receives a print job and rasterizes the print job into print image data on a page-by-page basis by executing image processing according to a printing attribute.

The image forming unit 112 prints raster data which is the print image data transmitted from the print job processing unit 111. In the present exemplary embodiment, the image forming unit 112 will be described as a printer engine. The image forming unit 112 forms an image on a printing sheet to create a printing outcome by executing image forming processing on the raster data that is generated by the print job processing unit 111 through raster image processor (RIP) processing. Further, in the present exemplary embodiment, toner is used for the image forming processing employing an electro-photographic method. However, the image forming method is not limited thereto. For example, ink may be used instead of toner.

The operation unit 113 serves as a user interface for operating and setting the printing apparatus 102. In the present exemplary embodiment, the operation unit 113 will be described as a device using a touch panel-type liquid crystal display (LCD). The sheet feeding unit 114 stores printing sheets used in the printing apparatus 102, and is referred to as a cassette or a deck. Generally, a plurality of the sheet feeding units 114 is disposed on the printing apparatus 102.

Figure 2:
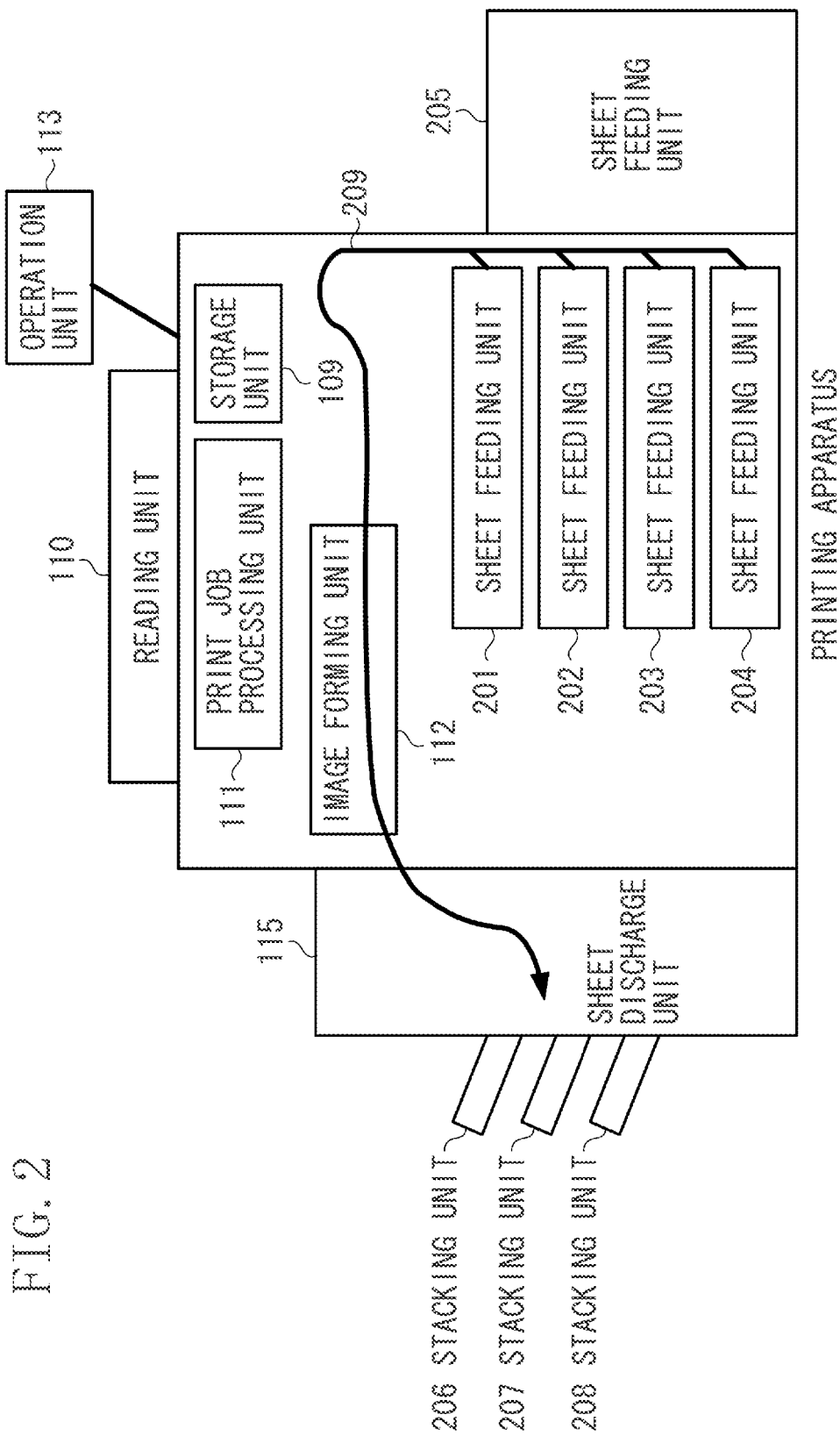
FIG. 2 is a diagram illustrating a configuration of a printing apparatus illustrated in FIG. 1.

Of a plurality of sheet feeding units 201 through 205 shown in FIG. 2, the print job processing unit 111 determines a sheet feeding unit from which a printing sheet is fed depending on the sheet attribute of the print job or the setting state of the printing apparatus 102. The fed printing sheet eventually becomes a printing outcome in the image forming unit 112. The sheet discharge unit 115 discharges the printing outcome created by the image forming unit 112 to the outside of the printing apparatus 102. In the present exemplary embodiment, the sheet discharge unit 115 will be described as a finisher. Generally, the sheet discharge unit 115 represented by a finisher or a stacker has a plurality of stacking trays as the sheet discharge destinations. The print job processing unit 111 determines the sheet discharge destination according to the attribute of the print job, and instructs and controls the sheet discharge operation.

The network 103 is a global or a local network represented by the internet or the LAN, and serves as a medium for connecting the printing apparatus 102 to the client computer 101. The network 103 employs a network communication technique represented by the TCP/IP method to establish the connection.

Lastly, the print job processing unit 111 according to the present exemplary embodiment will be described further. In the course of the processing of one print job, if the processing of the one print job is cancelled for some reason, the print job processing unit 111 stops the processing of a subsequent print job to be carried out after the one print job.

FIG. 2 is a diagram illustrating a configuration of the printing apparatus 102 illustrated in FIG. 1.

In FIG. 2, as described above, the printing apparatus 102 includes the storage unit 109, the reading unit 110, the print job processing unit 111, the image forming unit 112, the operation unit 113, the sheet feeding unit, and the sheet discharge unit 115. The sheet feeding unit (114 in FIG. 1) is configured of a plurality of sheet cassettes or sheet decks for feeding the sheets, i.e., the sheet feeding units 201, 202, 203, 204 and 205. The sheet discharge unit 115 is configured of a plurality of stacking trays for discharging the sheets i.e., stacking units 206, 207 and 208. A sheet conveyance path 209 illustrates a conveyance path of the printing sheet through which the printing sheet fed from any of the sheet feeding units 201 to 205 reaches any of the stacking units 206 to 208 via the image forming unit 112 after the print job processing unit 111 starts printing-control processing.

FIG. 3 is an explanatory diagram for making a comparison between the present embodiment and a conventional technique by illustrating a print job management table managed by a printing apparatus according to the conventional technique.

In FIG. 3, a print job management table 301 is a table for managing the print jobs present within the printing apparatus 102, included in the print job processing unit 111. With respect to each of the print jobs, the print job management table 301 includes information such as a print job name, an execution order, a processing status, a cancellation reason, and a print output order. These print jobs are listed in a receiving order in which the printing apparatus 102 has received the print jobs. Further, in FIG. 3, for example, the printing apparatus 102 stores five print jobs 302, 303, 304, 305 and 306.

The first-listed print job 302 shows information indicating that the execution order is first ("1"), the processing status is "OK", no cancellation reason is described ("-") because the printing processing has been completed normally, and the print output order is first ("1"). After completing the printing processing of the print job 302, the print job processing unit 111 determines that the print job 302 is ended normally, and automatically advances the processing to the subsequent print job.

The print job 303 shows information indicating that the execution order is second ("2"), the processing status is "canceled", the cancellation reason is "operator's instruction", and the print output order is not described ("-") because the printing processing has not been completed. After canceling the print job 303, the print job processing unit 111 determines that the print job 303 is ended normally, and automatically advances the processing to the subsequent print job 304.

The print job 304 shows information indicating that the execution order is third ("3"), the processing status is "OK", the cancellation reason is not described because the printing processing has been completed normally, and the print output order is second ("2"). After completing the printing processing of the print job 304, the print job processing unit 111 determines that the print job 304 is ended normally, and automatically advances the processing to the subsequent print job 305.

The information indicating that the execution order is fourth ("4"), the processing status is "canceled", the cancellation reason is "RIP error", and the print output order is not described ("-") because the printing processing has not been completed, is recorded for the print job 305. After cancelling the print job 305, the print job processing unit 111 determines that the print job 305 is ended normally, and automatically advances the processing to the subsequent print job 306.

Next, the print job 306 shows the information indicating that the execution order is fifth ("5"), the processing status is "OK", the cancellation reason is not described because the printing processing has been completed normally, and the print output order is third ("3"). After completing the printing processing of the print job 306, the print job processing unit 111 determines that the print job 306 is ended normally, and automatically shifts to a state where the processing for a subsequent print job can be started.

When the execution order and the print output order of the print jobs 302 to 306 are compared to each other, it is found that the print execution order instructed by the operator and the print output order do not conform to each other. In other words, the instructed execution order is the order of the print job 302, the print job 303, the print job 304, the print job 305, and the print job 306. However, the actual print output order is the order of the print job 302, the print job 304, and the print job 306.

This indicates that because one print job is cancelled due to some error in the course of execution of a plurality of print jobs, the processing automatically proceeds to a subsequent print job, so that the subsequent job is processed ahead of or instead of the cancelled print job, even if the cancelled print jobs are re-run later.

Therefore, because the printing apparatus 102 does not process the plurality of the print jobs according to the order instructed by the operator, the printing output will not be processed in the printing order desired by the operator, and thus a printing mode for consolidating a plurality of the print jobs into one printing outcome cannot be achieved. Such a printing result can be a critical problem particularly in the field of commercial printing in which the printing outcome is a commercial product or delivered to a print ordering party.

In comparison to the above-described conventional technique, FIG. 4 is an explanatory diagram illustrating a print job management table managed by the printing apparatus 102 according to the present invention.

A print job management table 401 is a table for managing the print jobs present within the printing apparatus 102, included in the print job processing unit 111. With respect to each of the print jobs, the print job management table 401 includes information such as a print job name, an execution order, a processing status, a cancellation reason, and a print output order. These print jobs are listed in a print job receiving order of the printing apparatus 102. Further, in FIG. 4, for example, the printing apparatus 102 stores five print jobs 402, 403, 404, 405 and 406.

The print job 402 shows information indicating that the execution order is first ("1"), the processing status is "OK", the cancelation reason is not described because the printing processing has been completed normally, and the print output order is first ("1"). After completing the printing processing of the print job 402, the print job processing unit 111 determines that the print job 402 is ended normally, and automatically advances the processing to the subsequent print job 403.

The print job 403 shows information indicating that the execution order is second ("2"), the processing status is "canceled", the cancellation reason is "operator's instruction", and the print output order is "unprinted" because the printing processing itself has not been completed. In this case, after cancelling the print job 403, the print job processing unit 111 determines that the print job 403 is ended normally, but controls the processing not to proceed to the subsequent print job automatically. Therefore, the printing apparatus 102 shifts to a stopped state, so that the information indicating that processing status is "stopped" and the print output order is "unprinted" is recorded for each of the subsequent print jobs 404 to 406.

As described above, in a case where one print job has been cancelled because of an error arising in the printing apparatus 102, the printing apparatus 102 does not advance the processing to a subsequent print job but controls the processing to stop executing the subsequent printing.

In a case where the cause of cancellation of the print job is resolved in some way and desired printing processing has been completed, the print job processing unit 111 may determine that the print job is ended normally, so as to automatically advance the processing to a subsequent print job by cancelling the stopped state of the printing apparatus 102. In this case, the print job 403 shows information indicating that the execution order is second, the processing status is "OK", the cancellation reason is not described because the printing processing has been completed normally, and the print output order is second. After completing the printing processing of the print job 403, the print job processing unit 111 determines that the print job 403 is ended normally, and automatically advances the processing to the subsequent print job (such as 404).

Further, in a case where one print job is cancelled and the printing apparatus 102 shifts to a stopped state, the information indicating that the processing of the print job is cancelled and the processing of the subsequent print job is stopped may be notified to the operator.

Furthermore, in a case where the information is notified to the operator, options of processing for the subsequent print job may be displayed on the operation unit 113 so that the processing of the subsequent print job may be switched according to the selected option of processing input by the operator. In addition, the above-described derived control processing will be described in detail with reference to FIG. 6.

On the other hand, in the above-described exemplary embodiment, the print job 403 has been cancelled because of the instruction of the operator, and for this reason, the printing apparatus 102 has shifted to a stand-by state. However, such a cancellation has been simply made because of the recognition of the operator, and thus there may be a case where the printing apparatus 102 does not have to shift to a stand-by state.

Therefore, in a case where one print job has been cancelled and that cancellation reason is the operator's instruction, for example, the print job processing unit 111 may determine that the print job is ended normally and automatically advance the processing to the subsequent print job without shifting the printing apparatus 102 to the stand-by state. In addition, the above-described derived control processing will be described in detail with reference to FIG. 5.

In comparison to the above-described conventional technique, FIG. 5 is an explanatory diagram illustrating a print job management table managed by the printing apparatus 102 according to the present exemplary embodiment. FIG. 5 also serves as an explanatory diagram of the derived control processing described earlier with reference to FIG. 4. A print job management table 501 is a table for managing the print jobs present within the printing apparatus 102, included in the print job processing unit 111. Then, with respect to each of the print jobs, the print job management table 501 includes information such as a print job name, an execution order, a processing status, a cancelation reason, and a print output order. These print jobs are listed in a receiving order in which the printing apparatus 102 has received the print jobs. Further, in FIG. 5, for example, the printing apparatus 102 stores five print jobs 502, 503, 504, 505 and 506.

The print job 502 shows information indicating that the execution order is first ("1"), the processing status is "OK", the cancellation reason is not described because the printing processing has been completed normally, and the print output order is first ("1"). After completing the printing processing of the print job 502, the print job processing unit 111 determines that the print job 502 is ended normally, and automatically advances the processing to the subsequent print job.

The print job 503 shows information indicating that the execution order is second ("2"), the processing status is "canceled", the cancellation reason is described as "operator's instruction", and the print output order is "unprinted" because the printing processing itself has not been completed. In this case, because the cancellation reason is described as "operator's instruction", even if the print job 503 is cancelled, the print job processing unit 111 determines that the print job 503 is ended normally and controls the processing to proceed to a subsequent print job automatically. Therefore, in a case where one print job has been cancelled, if a cancellation reason is the operator's instruction, for example, the print job processing unit 111 may determine that the print job is ended normally and automatically advance the processing to the subsequent print job without shifting the printing apparatus 102 to a stand-by state.

The print job 504 shows information indicating that the execution order is third ("3"), the processing status is "OK", the cancelation reason is not described because the printing processing has been completed normally, and the print output order is second ("2"). After completing the printing processing of the print job 504, the print job processing unit 111 determines that the print job 504 is ended normally, and automatically advances the processing to the subsequent print job.

The print job 505 shows information indicating that the execution order is fourth ("4"), and the processing status is "canceled". Furthermore, the print job 505 shows information indicating that the cancellation reason thereof is a RIP error, and the print output order is "unprinted" because the printing processing itself has not been completed. In this case, after cancelling the print job 505, the print job processing unit 111 determines that the print job 505 is ended normally, but controls the processing not to proceed to the subsequent print job automatically.

The print job 505 is cancelled because of the determination made by the printing apparatus 102 in the course of the processing of the print job 505, and thus the cancellation reason thereof is different from that of the print job 503, i.e., the cancellation is caused by the operator's instruction. Therefore, the cancellation reason thereof does not fall within the condition in which the processing automatically proceeds to the subsequent print job. Therefore, the printing apparatus 102 shifts to a stopped state, so that the information indicating that the processing status is "stopped" and the print output order is "unprinted" because the printing processing has not been completed, is recorded for the print job 504 serving as the subsequent print job.

As described above, in a case where one print job has been cancelled because of an error arising in the printing apparatus 102, the printing apparatus 102 does not advance the processing to the subsequent print job and controls the processing to stop executing the subsequent printing. However, the cancellation of the print job caused by the operator's instruction does not fall within its control, and a control is performed to advance the processing to the subsequent print job.

Figure 6:
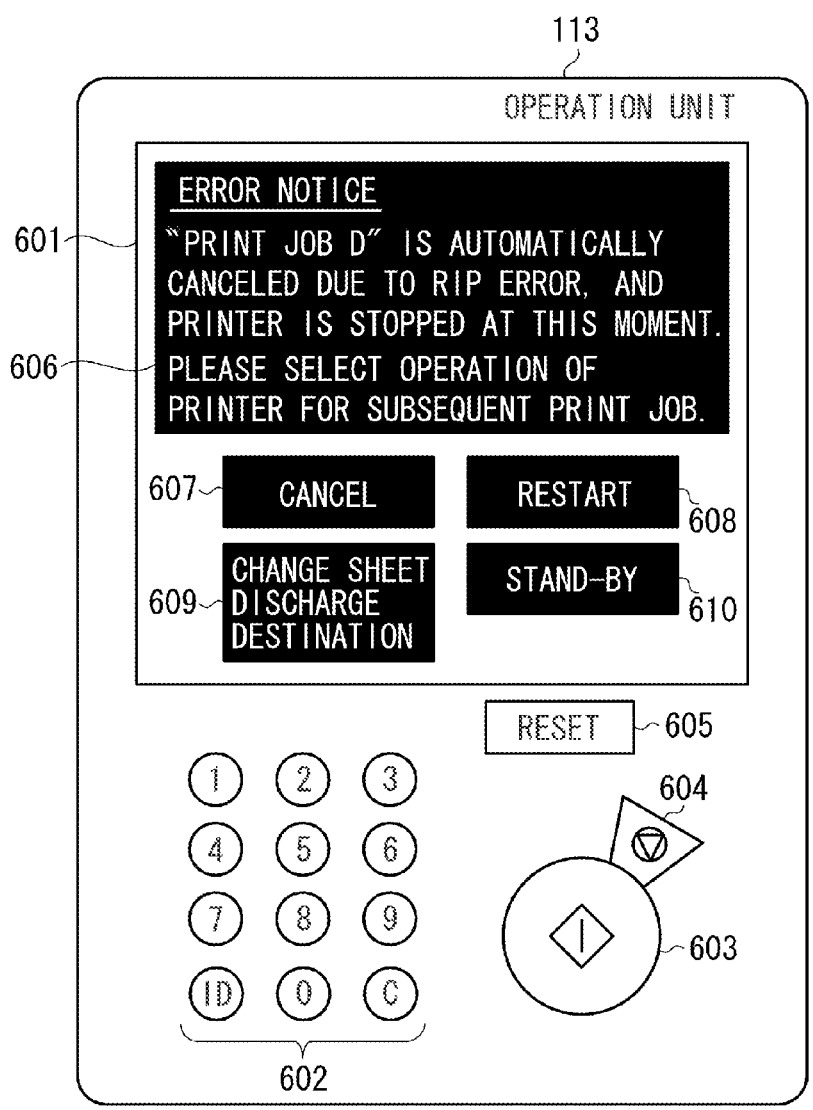
FIG. 6 is a plan view illustrating a configuration of an operation unit illustrated in FIG. 1.

FIG. 6 is a plan view illustrating a configuration of the operation unit 113 of FIG. 1, also serving as an explanatory diagram of the derived control processing described earlier with reference to FIG. 4. This display screen (user interface (UI) screen) corresponds to a screen used for a warning display to notify an error. After the processing of the print job is canceled in a RIP processing period, the display screen allows the user to confirm that the processing of the subsequent print job is stopped by displaying a warning message illustrated in FIG. 6, and functions as a screen for receiving the processing of the subsequent print job selected by the user from among a plurality of specific options of processing.

In FIG. 6, the operation unit 113 includes a display unit 601, input keys 602, a start key 603, a stop key 604, and a reset key 605. In FIG. 6, a warning message 606, a cancel button 607, a restart button 608, a sheet discharge destination change button 609, and a stand-by button 610 are displayed on the display unit 601.

As described above, the display unit 601 is a touch panel-type LCD serving as a user interface for operating and setting the printing apparatus 102.

The input keys 602 include a numeric keypad for inputting a numerical value and a clear key for cancelling an input. In the present exemplary embodiment, the input keys 602 will be described as hard keys.

The start key 603 serves as a user interface for inputting a start instruction of a copy job or a fax job. In the present exemplary embodiment, the start key 603 as a hard key will be described. The stop key 604 serves as a user interface for inputting a stop instruction of a copy job in execution. In the present exemplary embodiment, the stop key 604 will be described as a hard key. The reset key 605 serves as a user interface for resetting an input value or a set value to an initial value on the display screen. In the present exemplary embodiment, the reset key 605 will be described as a hard key.

In a case where the processing of one print job is cancelled for some reason in the course of the processing of that print job, the display unit 601 displays the warning message 606 for notifying the operator that the processing is cancelled and processing of a subsequent print job is stopped. As long as content of the warning message 606 is similar to the example illustrated in FIG. 6 (or at least similar in intent), the content thereof is not limited specifically thereto.

The print job processing unit 111 displays options of processing for the subsequent print job on the display unit 601 together with the warning message 606 for prompting the operator to select the processing.

For example, the warning message 606 notifies the operator that the print job 505 described in FIG. 5 is automatically cancelled because of the RIP error, and prompts the operator to select the processing for the subsequent print job. In addition, the following candidates are provided for the options of processing for the subsequent print job. For example, cancelling all of the subsequent print jobs, restarting the printing processing, changing a stacking tray for discharging the sheet (i.e., changing a sheet discharge destination), and standing by until the cancelled print job is printed normally may be provided as the candidates of processing for the subsequent print job.

These options of processing are respectively allocated to the cancel button 607, the restart button 608, the sheet discharge destination change button 609, and the stand-by button 610, so that the print job processing unit 111 executes the processing according to the option selected by the operator. Therefore, if the cancel button 607 is selected, the print job processing unit 111 cancels all of the subsequent print jobs. Further, if the restart button 608 is selected by the operator, the print job processing unit 111 restarts the printing processing of the subsequent print job. If the sheet discharge destination change button 609 is selected by the operator, the print job processing unit 111 changes the stacking tray for discharging the subsequent print job. Furthermore, if the stand-by button 610 is selected by the operator, the print job processing unit 111 waits until the canceled print job is printed normally.

As described above, in a case where one print job is cancelled and the printing apparatus 102 shifts to a stopped state, a notice indicating that the processing of the print job is cancelled and the subsequent print job is stopped is provided to the operator. Further, when the notice is to be provided to the operator, the options of processing for the subsequent print job will be displayed on the operation unit 113 of the printing apparatus 102, and the processing of the subsequent print job is switched according to the selected option of processing input by the operator.

Figure 7:
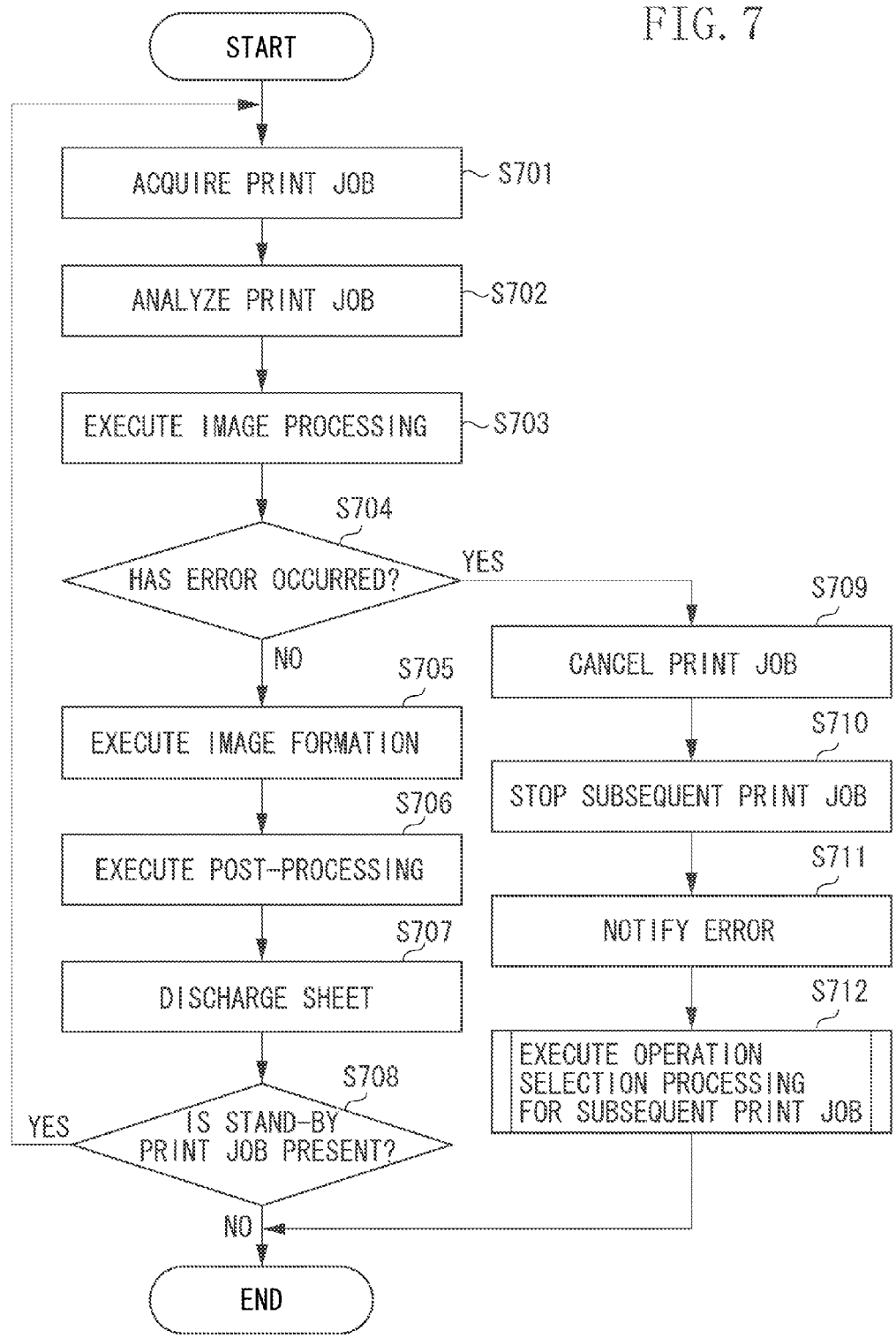
FIG. 7 is a flowchart illustrating a control method of the printing apparatus according to a present exemplary embodiment.

FIG. 7 is a flowchart illustrating a control method of the printing apparatus 102 according to the present exemplary embodiment. In the present exemplary embodiment, examples of the print job processing and the control processing will be described. The print job processing unit 111 executes the processing according to a program stored in the storage unit 109 of the printing apparatus 102 to realize the method of the flowchart. In addition, the print job processing unit 111 may be configured such that the CPU 107 executes the function processing of the print job processing unit 111.

First, when the processing of the printing system is started, in step S701, the print job processing unit 111 acquires a print job. The print job processing unit 111 temporarily spools the acquired print job in the storage unit 109. For example, the print job may be PDL data in a PDL format sent from the client computer 101.

Next, in step S702, the print job processing unit 111 analyzes the print job and acquires the information such as a type and print settings of the print job. Then, in step S703, the print job processing unit 111 executes image processing on the print job and acquires raster data subjected to RIP process. Next, in step S704, the print job processing unit 111 determines whether any error has occurred in the course of the processing of the print job.

In step S704, if the print job processing unit 111 determines that some error has occurred therein (YES in step S704), the processing proceeds to step S709. In step S709, the print job processing unit 111 cancels the print job in which the error has occurred. On the other hand, in step S704, if the print job processing unit 111 determines that any error has not occurred therein (NO in step S704), the processing proceeds to step S705.

In step S710, the print job processing unit 111 stops all of the subsequent jobs and shifts the printing apparatus 102 to a stand-by state.

Next, in step S711, the print job processing unit 111 notifies the operator of an error by displaying various kinds of information such as a message indicating that the print job is cancelled and the processing of the subsequent print job is stopped, the options of processing for the subsequent print job, and a message prompting the operator to select the processing.

Next, in step S712, the print job processing unit 111 receives operation selection processing for the subsequent print job from the user, and ends the processing of the printing system. The processing in step S712 will be described below in detail with reference to FIG. 8.

On the other hand, in step S704, if the print job processing unit 111 determines that the error has not occurred therein (NO in step S704), in step S705, the print job processing unit 111 instructs the image forming unit 112 to execute image forming processing on a printing sheet by transferring the raster data of the print job to the image forming unit 112.

Next, in step S706, the print job processing unit 111 provides an instruction for executing the post-processing specified by the print setting of the print job, so that the post-processing is executed on the printing sheet on which the image has been formed and which is conveyed to any of the stacking units 206 to 208 via the sheet discharge unit 115.

Then, in step S707, the print job processing unit 111 provides an instruction for discharging the post-processed printing sheet to any of the stacking units 206 to 208 as a final printing outcome. Next, in step S708, the print job processing unit 111 determines whether there is any stand-by print job waiting for the printing processing. If the print job processing unit 111 determines that there is a stand-by print job waiting for the printing processing (YES in step S708), the processing returns to step S701. On the other hand, in step S708, if the print job processing unit 111 determines that there is no stand-by print job waiting for the printing processing (NO in step S708), the print job processing unit 111 ends the processing of the printing system.

Figure 8:
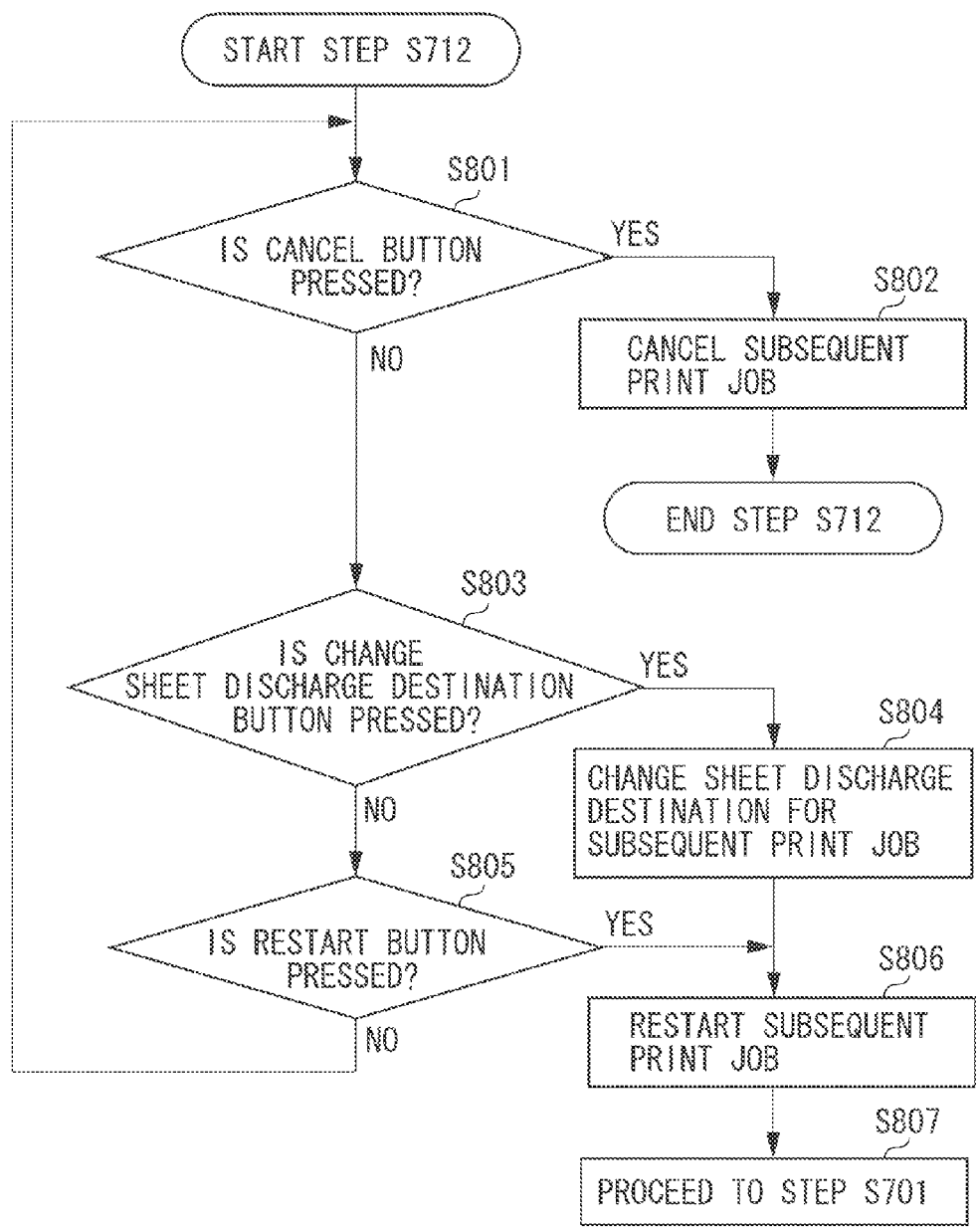
FIG. 8 is a flowchart illustrating a control method of the printing apparatus according to the present exemplary embodiment.

FIG. 8 is a flowchart illustrating a control method of the printing apparatus 102 according to the present exemplary embodiment. In this flowchart, the processing in step S712 described in FIG. 7 will be described in detail. The print job processing unit 111 executes the processing according to a program stored in the storage unit 109 of the printing apparatus 102 to realize the flowchart.

When the processing of step S712 is started, in step S801, the print job processing unit 111 determines whether the cancel button 607 displayed on the operation unit 113 is pressed by the user.

In step S801, if the print job processing unit 111 determines that the cancel button 607 is not pressed by the user (NO in step S801), the processing proceeds to step S803. In step S803, the print job processing unit 111 determines whether the sheet discharge destination change button 609 displayed on the operation unit 113 is pressed by the user.

On the other hand, in step S801, if the print job processing unit 111 determines that the cancel button 607 is pressed by the user (YES in step S801), the processing proceeds to step S802.

In step S803, if the print job processing unit 111 determines that the sheet discharge destination change button 609 is pressed (YES in step S803), the processing proceeds to step S804. In step S804, the print job processing unit 111 changes the stacking tray for discharging the subsequent print job, and advances the processing to step S806.

On the other hand, in step S803, if the print job processing unit 111 determines that the sheet discharge destination change button 609 is not pressed (NO in step S803), the processing proceeds to step S805. In step S805, the print job processing unit 111 determines whether the restart button 608 displayed on the operation unit 113 is pressed by the user.

If the print job processing unit 111 determines that the restart button 608 is pressed (YES in step S805), the processing proceeds to step S806. In step S806, the print job processing unit 111 cancels the stand-by state of the printing apparatus 102 and restarts the processing of the subsequent stand-by print job. Thereafter, the processing proceeds to step S807 so that the processing proceeds to step S701 described in FIG. 7.

On the other hand, in step S805, if the print job processing unit 111 determines that the restart button 608 is not pressed (NO in step S805), the processing returns to step S801, which state is the same as the state where the stand-by button 610 displayed on the operation unit 113 is pressed. In step S801, if the print job processing unit 111 determines that the cancel button 607 is pressed (YES in step S801), the processing proceeds to step S802. In step S802, the print job processing unit 111 cancels all of the subsequent jobs and ends the processing of step S712.

Finally, according to the present exemplary embodiment, the printing system enables the operator to certainly acquire the printing outcome in a correct printing order by executing the printing processing and the output processing of a plurality of print jobs according to the order instructed by the operator.

A second exemplary embodiment will be described in detail. In the present exemplary embodiment, only differences between the first and the present exemplary embodiments will be described while descriptions common to the first exemplary embodiment will be omitted.

The usage of the printing apparatus 102 may vary depending on how the operator inputs the print job. As one usage of the printing apparatus 102, as described in the first exemplary embodiment, there may be a case where the operator executes printing by combining a plurality of print jobs and acquires one printing outcome by consolidating the printing outputs thereof. In this case, the printing apparatus 102 has to accomplish the printing processing and outputs thereof according to the order of the print jobs instructed by the operator. On the other hand, as another usage of the printing apparatus 102, conventionally, there has been a case where the operator does not necessarily follow the order of the input print jobs but places priority on processing the print jobs as much as possible.

In this case, because the printing apparatus 102 regards the operation as a valid cancellation when one print job is cancelled, the print job comes into a normal ending state. The printing processing will proceed to a next print job in a case where there is another print job following thereafter. As described above, because the usage of the printing apparatus 102 may vary depending on how the operator inputs the print job, the printing system is not always flexible if the usage thereof is limited to either the former case or the latter case.

Therefore, in the present exemplary embodiment, as an operation mode in the initial setting of the printing apparatus 102, the printing apparatus 102 includes a print stop mode for stopping the processing of the subsequent print job in a case where the processing of one print job is canceled for some reason in the course of the processing of that print job. On the other hand, as another operation mode in the initial setting of the printing apparatus 102, the printing apparatus 102 includes a print continue mode for continuing the processing of the subsequent print job in a case where the processing of one print job is cancelled for some reason in the course of the processing of that print job.

The above operation modes are specified as default operation modes of the printing apparatus 102 in the initial setting of the printing apparatus 102, so that the printing apparatus 102 operates according to any of these operation modes set thereto. Furthermore, in a case where the print stop mode is set to the initial setting while a below-described subsequent job priority mode is provided as another item for the initial setting, the printing apparatus 102 is configured to disable the subsequent job priority mode. The subsequent job priority mode is a function for executing a subsequent print job in advance of a preceding print job by cancelling the preceding print job. The subsequent job priority mode is implemented without waiting for the solving of a shortage of resources when the print job cannot be processed continuously because of the shortage of resources like expendable supplies such as printing sheets and toner.

Therefore, when the subsequent job priority mode is disabled, even in a case where the printing apparatus 102 cannot process the print job continuously because of the shortage of resources like expendable supplies such as printing sheets and toner (developer), the printing apparatus 102 does not cancel the print job but waits for the solving of the shortage of resources. The operation mode corresponding to the above-described processing is referred to as a print stand-by mode.

As described above, in addition to the first exemplary embodiment, the present exemplary embodiment is directed to a printing system capable of satisfying the requirement thereof to a maximum extent according to various usage modes of the operator who uses the printing system.

Figure 9:
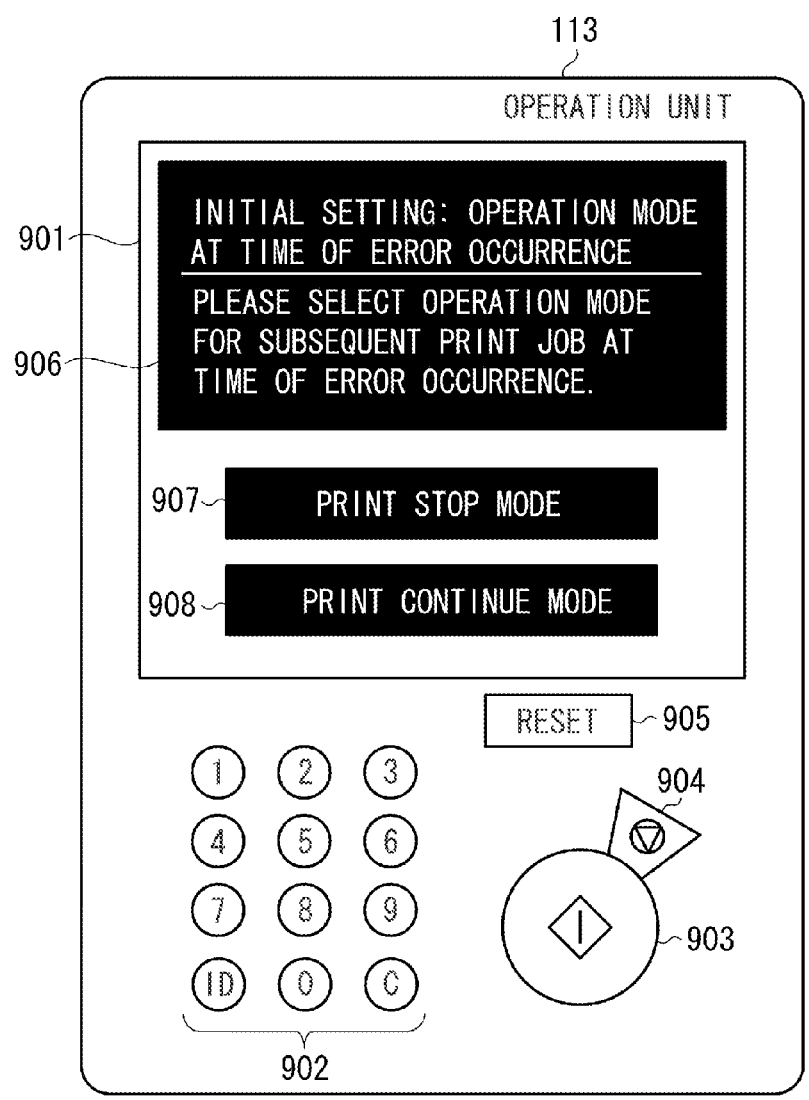
FIG. 9 is a plan view illustrating a configuration of the operation unit illustrated in FIG. 1.

FIG. 9 is a plan view illustrating another configuration example of the operation unit 113 illustrated in FIG. 1. In FIG. 9, the operation unit 113 includes a display unit 901, input keys 902, a start key 903, a stop key 904, and a reset key 905. In FIG. 9, an initial setting message 906, a print stop mode setting button 907, and a print continue mode setting button 908 are displayed on the display unit 901. As described above, the display unit 901 is a touch panel-type LCD serving as a user interface for operating and setting the printing apparatus 102.

The input keys 902 include a numeric keypad for inputting a numerical value and a clear key for cancelling an input. In the present exemplary embodiment, the input keys 902 will be described as hard keys. The start key 903 serves as a user interface for inputting a start instruction of a copy job or a fax job. In the present exemplary embodiment, the start key 903 will be described as a hard key. The stop key 904 serves as a user interface for inputting a stop instruction of a copy job in execution. In the present exemplary embodiment, the stop key 904 will be described as a hard key. The reset key 905 serves as a user interface for resetting an input value or a setting value to an initial value on the display screen. In the present exemplary embodiment, the reset key 905 will be described as a hard key.

As an initial setting item of the printing apparatus 102, the initial setting message 906 for prompting the operator to select an operation mode in an error occurrence period is displayed on the display unit 901. In a case where the processing of one print job is cancelled for some reason in the course of the processing of that print job, the initial setting message 906 prompts the operator to select and set an operation mode for the subsequent print job as an initial value of the printing apparatus 102. Further, in a case where the processing of one print job is cancelled for some reason in the course of the processing of that print job, the print job processing unit 111 displays options of processing for the subsequent job on the display unit 901 as the operation modes thereof.

A print stop mode is the operation mode serving as one option of processing for the subsequent print job. The print stop mode stops the processing of the subsequent print job in a case where the processing of a print job is cancelled for some reason in the course of the processing of that print job.

Further, a print continue mode is the operation mode serving as another option of processing for the subsequent print job. The print continue mode continues the processing of the subsequent print job in a case where the processing of a print job is cancelled for some reason in the course of the processing of that print job. The print stop mode and the print continue mode are respectively allocated to the print stop mode setting button 907 and the print continue mode setting button 908, so that the print job processing unit 111 operates accordingly by setting the initial setting value of the printing apparatus 102 according to the selection made by the operator.

When the print stop mode setting button 907 is selected, the print job processing unit 111 operates in a mode for stopping the processing of the subsequent print job in a case where the processing of a print job is cancelled for some reason in the course of the processing of that print job.

On the other hand, when the print continue mode setting button 908 is selected, the print job processing unit 111 operates in a mode for continuing the processing of the subsequent print job in a case where the processing of a print job is cancelled for some reason in the course of the processing of that print job.

As described above, as the operation mode in the initial setting of the printing apparatus 102, the printing apparatus 102 includes the print stop mode for stopping the processing of the subsequent print job in a case where the processing of a print job is cancelled for some reason in the course of the processing of that print job.

On the other hand, as another operation mode in the initial setting of the printing apparatus 102, the printing apparatus 102 includes the print continue mode for continuing the processing of the subsequent print job in a case where the processing of a print job is cancelled for some reason in the course of the processing of that print job. Then, the above operation modes are specified as default operation modes of the printing apparatus 102 in the initial setting of the printing apparatus 102, so that the printing apparatus 102 operates according to any of these operation modes set thereto.

Figure 10:
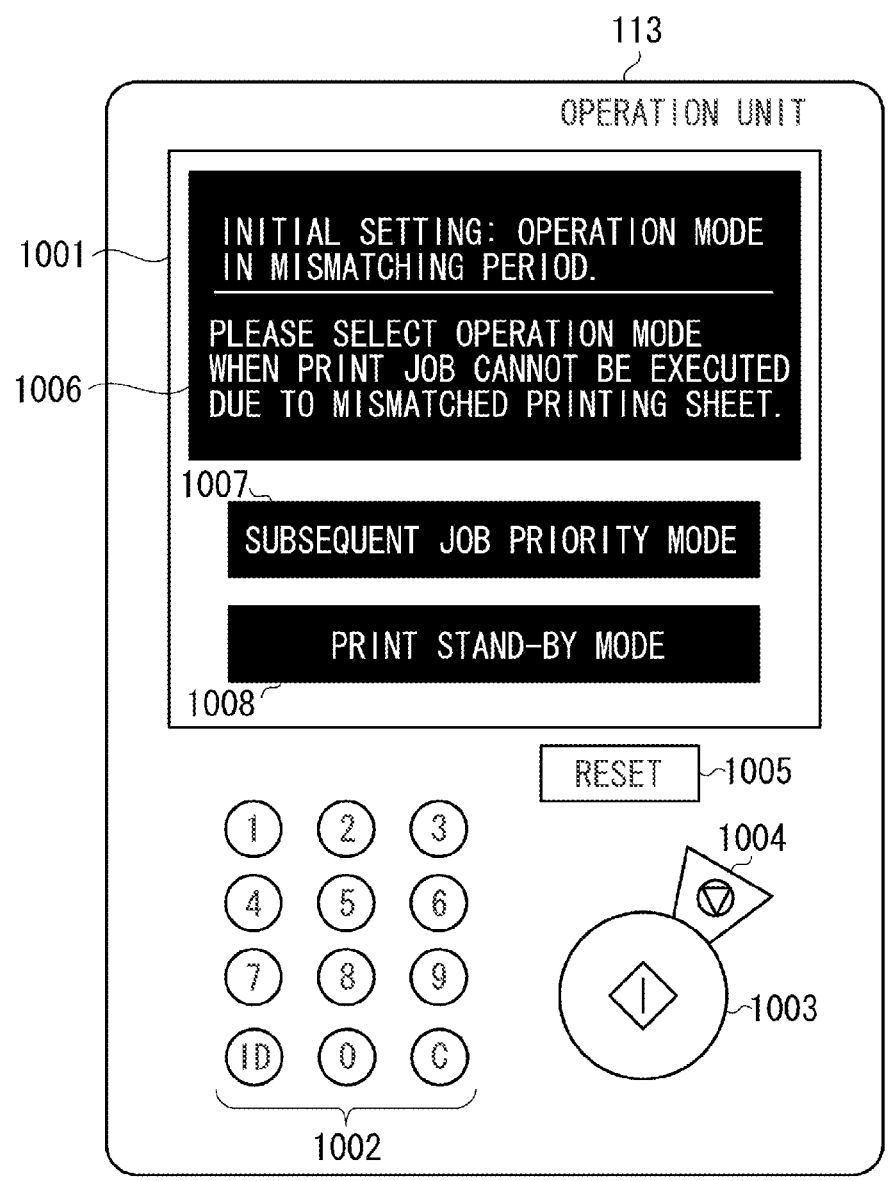
FIG. 10 is a plan view illustrating a configuration of the operation unit illustrated in FIG. 1.

FIG. 10 is a plan view illustrating another configuration example of the operation unit 113 illustrated in FIG. 1. In FIG. 10, the operation unit 113 includes a display unit 1001, input keys 1002, a start key 1003, a stop key 1004, and a reset key 1005.

In FIG. 10, an initial setting message 1006, a subsequent job priority mode-setting button 1007, and a print stand-by mode-setting button 1008 are displayed on the display unit 1001.

As described above, the display unit 1001 is a touch panel-type LCD serving as a user interface for operating and setting the printing apparatus 102.

The input keys 1002 include a numeric keypad for inputting a numerical value and a clear key for cancelling an input. In the present exemplary embodiment, the input keys 1002 will be described as hard keys. The start key 1003 serves as a user interface for inputting a start instruction of a copy job or a fax job. In the present exemplary embodiment, the start key 1003 will be described as a hard key. The stop key 1004 serves as a user interface for inputting a stop instruction for a copy job in progress. In the present exemplary embodiment, the stop key 1004 will be described as a hard key. The reset key 1005 serves as a user interface for resetting an input value or a setting value to an initial value on the display screen. In the present exemplary embodiment, the reset key 1005 will be described as a hard key.

As the initial setting item of the printing apparatus 102, the initial setting message 1006 for prompting the operator to select the operation mode in a mismatching period is displayed on the display unit 1001. The operation mode in the mismatching period is set to the operation mode of the printing apparatus 102 in a case where the print job cannot be processed continuously because of the shortage of resources like the expendable supplies such as printing sheets and toner that are necessary to process the print job. In a case where mismatching of the print job arises because of the shortage of resources like expendable supplies such as printing sheets and toner, the initial setting message 1006 prompts the operator to select and set the operation mode of the subsequent print job as an initial value of the printing apparatus 102.

Further, in a case where mismatching of the print job arises because of the shortage of resources like expendable supplies such as printing sheets and toner, the print job processing unit 111 displays options of processing for the subsequent print job on the display unit 1001 as the operation modes thereof. The following modes may be provided as the options of processing for the subsequent print job. The subsequent job priority mode is an operation mode for executing a subsequent print job in advance of a preceding print job. The subsequent job priority mode is implemented by canceling the preceding print job without waiting for solving of the shortage of resources when mismatching of the print job arises because of the shortage of resources.

Further, as another option of processing for the subsequent print job, the print stand-by mode is an operation mode for continuously waiting for the solving of the shortage of resources without cancelling the print job in a case where the mismatching of the print job arises because of the shortage of resources. Then, the subsequent job priority mode and the print stand-by mode are respectively allocated to the subsequent job priority mode setting button 1007 and the print stand-by mode setting button 1008, so that the print job processing unit 111 operates accordingly by setting the initial setting value of the printing apparatus 102 according to the selection made by the operator.

When the subsequent job priority mode setting button 1007 is selected, the print job processing unit 111 operates in a mode for executing the subsequent print job in advance of the preceding print job. The subsequent job priority mode is implemented by cancelling the preceding print job without waiting for the solving of the shortage of resources in a case where mismatching of the print job arises because of the shortage of resources.

On the other hand, when the print stand-by mode setting button 1008 is selected, the print job processing unit 111 operates in a mode for continuously waiting for the solving of the shortage of resources without cancelling the print job in a case where mismatching of the print job arises because of the shortage of resources.

In a case where the print stop mode described in FIG. 9 is set as the operation mode of the initial setting item for the printing apparatus 102, the subsequent job priority mode setting button 1007 of FIG. 10 is disabled and cannot be selected from the display unit 1001. Alternatively, even if the subsequent job priority mode setting button 1007 can be selected from the display unit 1001, the initial setting value for the operation mode in the mismatching period may be controlled to be always the print stand-by mode.

This is because the subsequent print job may be processed ahead of the cancelled print job even though the print stop mode described in FIG. 9 is set thereto if the print job is processed in the subsequent job priority mode. Therefore, the printing apparatus 102 does not process the print jobs according to the order instructed by the operator, so that the printing outputs will not be processed in the printing order desired by the operator, and thus the printing outputs cannot be regarded as the printing outcomes.

As the operation mode in the initial setting of the printing apparatus 102, the printing apparatus 102 includes the subsequent job priority mode for executing the subsequent print job in advance of the preceding print job and the subsequent job priority mode is implemented by cancelling the preceding print job without waiting for the solving of the shortage of resources in a case where mismatching of the print job arises because of the shortage of resources. On the other hand, as another operation mode in the initial setting of the printing apparatus 102, the printing apparatus 102 includes the print stand-by mode for continuously waiting for the solving of a shortage of resources without cancelling the print job in a case where mismatching of the print job arises because of the shortage of resources.

The above operation modes are specified as default operation modes of the printing apparatus 102 in the initial setting of the printing apparatus 102, so that the printing apparatus 102 operates according to any of these operation modes set thereto. However, in a case where the print stop mode described in FIG. 9 is previously set as the operation mode in the initial setting of the printing apparatus 102, the initial setting value of the operation mode in the mismatching period is controlled to be always the print stand-by mode.

Figure 11:
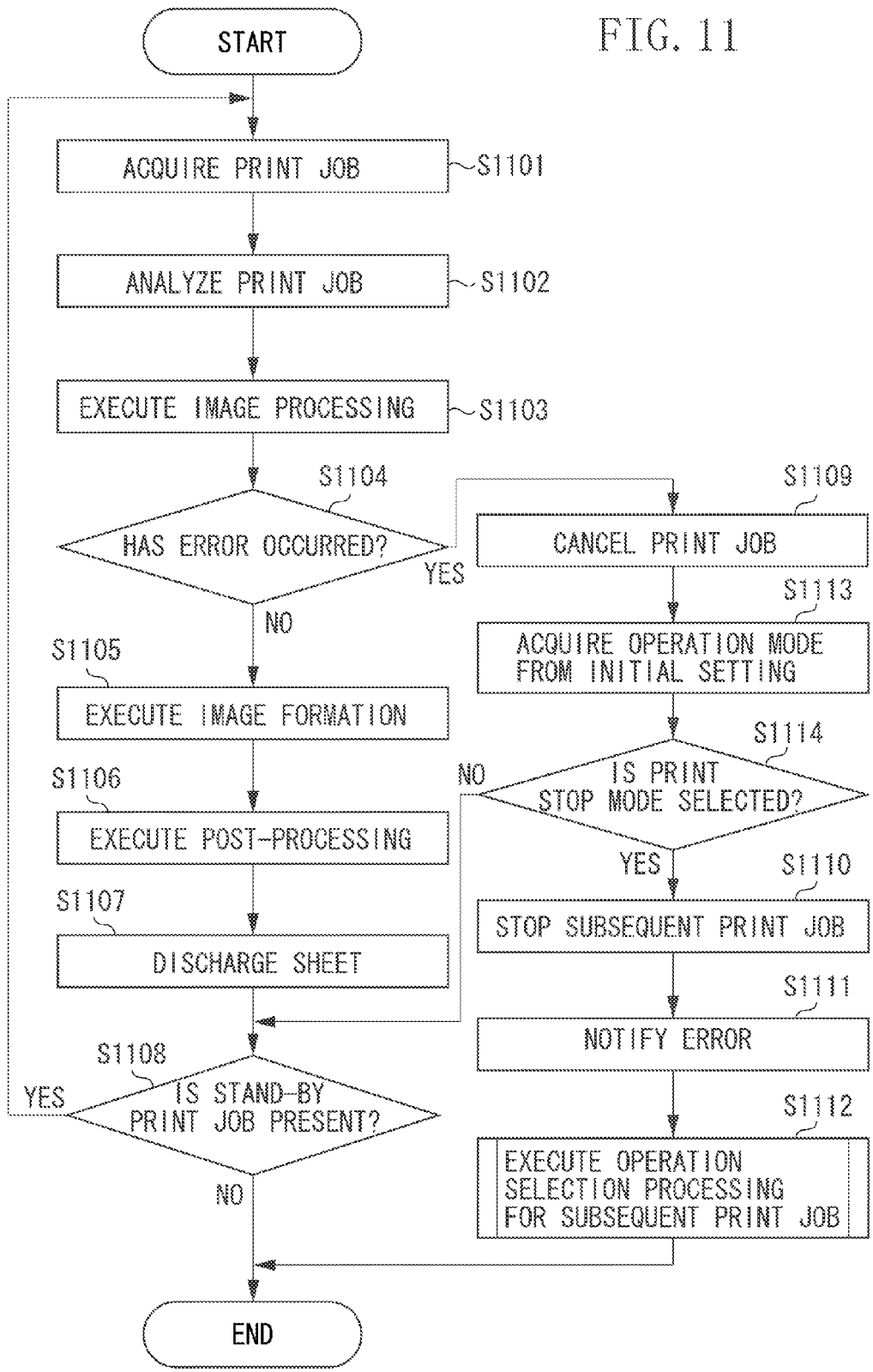
FIG. 11 is a flowchart illustrating a control method of the printing apparatus according to the present exemplary embodiment.

FIG. 11 is a flowchart illustrating a control method of the printing apparatus 102 according to the present exemplary embodiment. This flowchart illustrates examples of the print job processing and the control processing of the printing system according to the present exemplary embodiment. The print job processing unit 111 executes the processing according to a program stored in the storage unit 109 of the printing apparatus 102 to realize the process of the flowchart.

First, when the processing of the printing system is started, in step S1101, the print job processing unit 111 acquires a print job. The print job processing unit 111 temporarily spools the acquired print job in the storage unit 109. For example, the print job may be PDL data in a PDL format sent from the client computer 101.

Next, in step S1102, the print job processing unit 111 analyzes the print job and acquires the information such as a type and print settings of the print job. Then, in step S1103, the print job processing unit 111 executes image processing on the print job and acquires the raster data subjected to RIP process. Next, in step S1104, the print job processing unit 111 determines whether any error has occurred in the course of the processing of the print job.

In step S1104, if the print job processing unit 111 determines that some error has occurred in the course of the processing of the print job (YES in step S1104), the processing proceeds to step S1109. In step S1109, the print job processing unit 111 cancels the print job in which the error has occurred and moves on to S1113.

On the other hand, in step S1104, if the print job processing unit 111 determines that any error has not occurred in the course of the processing of the print job (NO in step S1104), the processing proceeds to step S1105.

In step S1113, the print job processing unit 111 acquires a setting value of the operation mode of the printing apparatus 102 by reading the initial setting information of the printing apparatus 102 stored in the storage unit 109. The setting value of the operation mode is either the print stop mode or the print continue mode described in FIG. 9. The print stop mode is an operation mode for stopping the processing of the subsequent print job in a case where the processing of one print job is cancelled for some reason in the course of the processing of that print job.

On the other hand, the print continue mode is an operation mode for continuing the processing of the subsequent print job in a case where the processing of one print job is cancelled for some reason in the course of the processing of that print job.

Next, in step S1114, the print job processing unit 111 determines whether the setting value of the operation mode is the print stop mode for stopping the processing of the subsequent print job.

In a case where the print job processing unit 111 determines that the operation mode is the print stop mode (YES in step S1114), the processing proceeds to step S1110. In step S1110, the print job processing unit 111 stops all of the subsequent jobs and shifts the printing apparatus 102 to the stand-by state. On the other hand, in step S1114, if the print job processing unit 111 determines that the operation mode is not the print stop mode (NO in step S1114), the processing proceeds to step S1108.

Following step S1110, in step S1111, the print job processing unit 111 displays a notice indicating that the print job is cancelled and the processing of the subsequent print job is stopped. At the same time, in step S1111, the print job-processing unit 111 displays an error notice including options of processing for the subsequent job and a message prompting the operator to select the processing on the operation unit 111.

Next, in step S1112, the print job processing unit 111 executes operation selection processing for the subsequent job and ends the processing of the printing system. The processing executed in step S1112 will be described below in detail with reference to FIG. 12.

On the other hand, in step S1104, if the print job processing unit 111 determines that any error has not occurred in the course of the processing of the print job (NO in step S1104), the print job processing unit 111 transfers the raster data of that print job to the image forming unit 112. Then, in step S1105, the print job processing unit 111 instructs the image forming unit 112 to execute image forming processing on a printing sheet.

Next, in step S1106, the print job processing unit 111 provides an instruction for executing the post-processing specified by the print setting of the print job, so that the post-processing is executed on the printing sheet on which the image has been formed, and which is conveyed to any of the stacking units 206 to 208 via the sheet discharge unit 115. Then, in step S1107, the print job processing unit 111 provides an instruction for discharging the post-processed printing sheet to any of the stacking units 206 to 208 as a final printing outcome. Next, in step S1108, the print job processing unit 111 determines whether there is any stand-by print job waiting for the printing processing. If the print job processing unit 111 determines that there is a stand-by print job waiting for the printing processing (YES in step S1108), the processing returns to step S1101. On the other hand, in step S1108, if the print job processing unit 111 determines that there is no stand-by print job waiting for the printing processing (NO in step S1108), the print job processing unit 111 ends the processing of the printing system.

Figure 12:
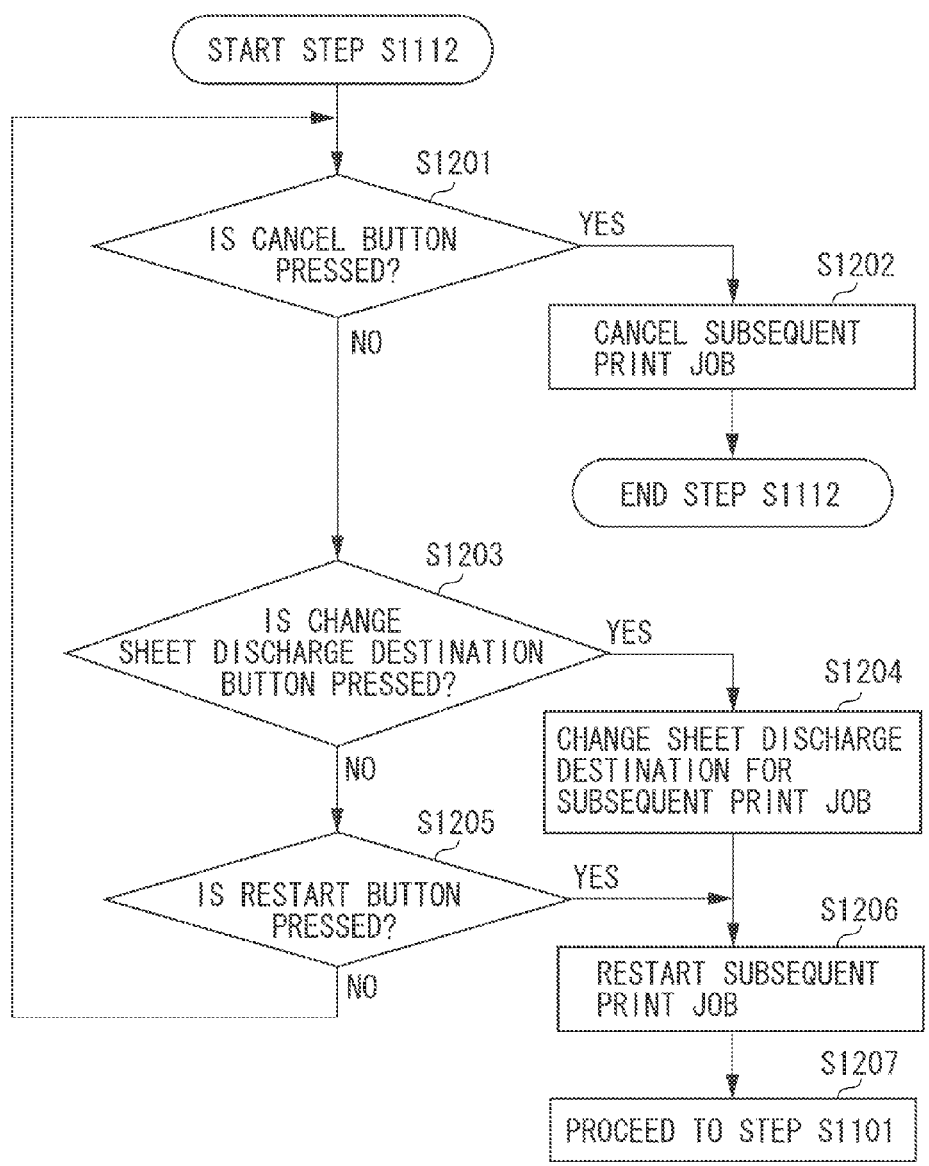
FIG. 12 is a flowchart illustrating a control method of the printing apparatus according to the present exemplary embodiment.

FIG. 12 is a flowchart illustrating a control method of the printing apparatus 102 according to the present exemplary embodiment. The flowchart illustrates detailed examples of the processing described in step S1112 of FIG. 11, corresponding to the examples of the print job processing and the control processing of the printing system according to the present exemplary embodiment. The print job processing unit 111 executes the processing according to a program stored in the storage unit 109 of the printing apparatus 102 to realize the flowchart.

When the processing of step S1112 is started, in step S1201, the print job processing unit 111 determines whether the cancel button 607 displayed on the operation unit 113 is pressed by the user. In step S1201, if the print job processing unit 111 determines that the cancel button 607 is not pressed by the user (NO in step S1201), the processing proceeds to step S1203. In step S1203, the print job processing unit 111 determines whether the sheet discharge destination change button 609 displayed on the operation unit 113 is pressed by the user.

On the other hand, in step S1201, if the print job processing unit 111 determines that the cancel button 607 is pressed (YES in step S1201), the processing proceeds to step S1202.

In step S1203, if the print job processing unit 111 determines that the sheet discharge destination change button 609 is pressed by the user (YES in step S1203), the processing proceeds to step S1204. In step S1204, the print job processing unit 111 changes the stacking tray for discharging the subsequent print job, and advances the processing to step S1206.

On the other hand, in step S1203, if the print job processing unit 111 determines that the sheet discharge destination change button 609 is not pressed by the user (NO in step S1203), the processing proceeds to step S1205. In step S1205, the print job processing unit 111 determines whether the restart button 608 displayed on the operation unit 113 is pressed by the user.

If the print job processing unit determines that the restart button 608 is pressed by the user (YES in step S1205), the processing proceeds to step S1206. In step S1206, the print job processing unit 111 cancels the stand-by state of the printing apparatus 102 to restart the processing of the stand-by print job. Then in step S1207, the print job processing unit 111 advances the processing to step S1101 described in FIG. 11.

On the other hand, in step S1205, if the print job processing unit 111 determines that the restart button 608 is not pressed by the user (NO in step S1205), the processing returns to step S1201, so that the state is the same as the state where the stand-by button 610 displayed on the operation unit 113 is pressed.

Returning to step S1201, if the print job processing unit 111 determines that the cancel button 607 is pressed (YES in step S1201), the processing proceeds to step S1202. In step S1202, the print job processing unit 111 cancels all of the subsequent jobs and ends the processing of step S1112.

Figure 13:
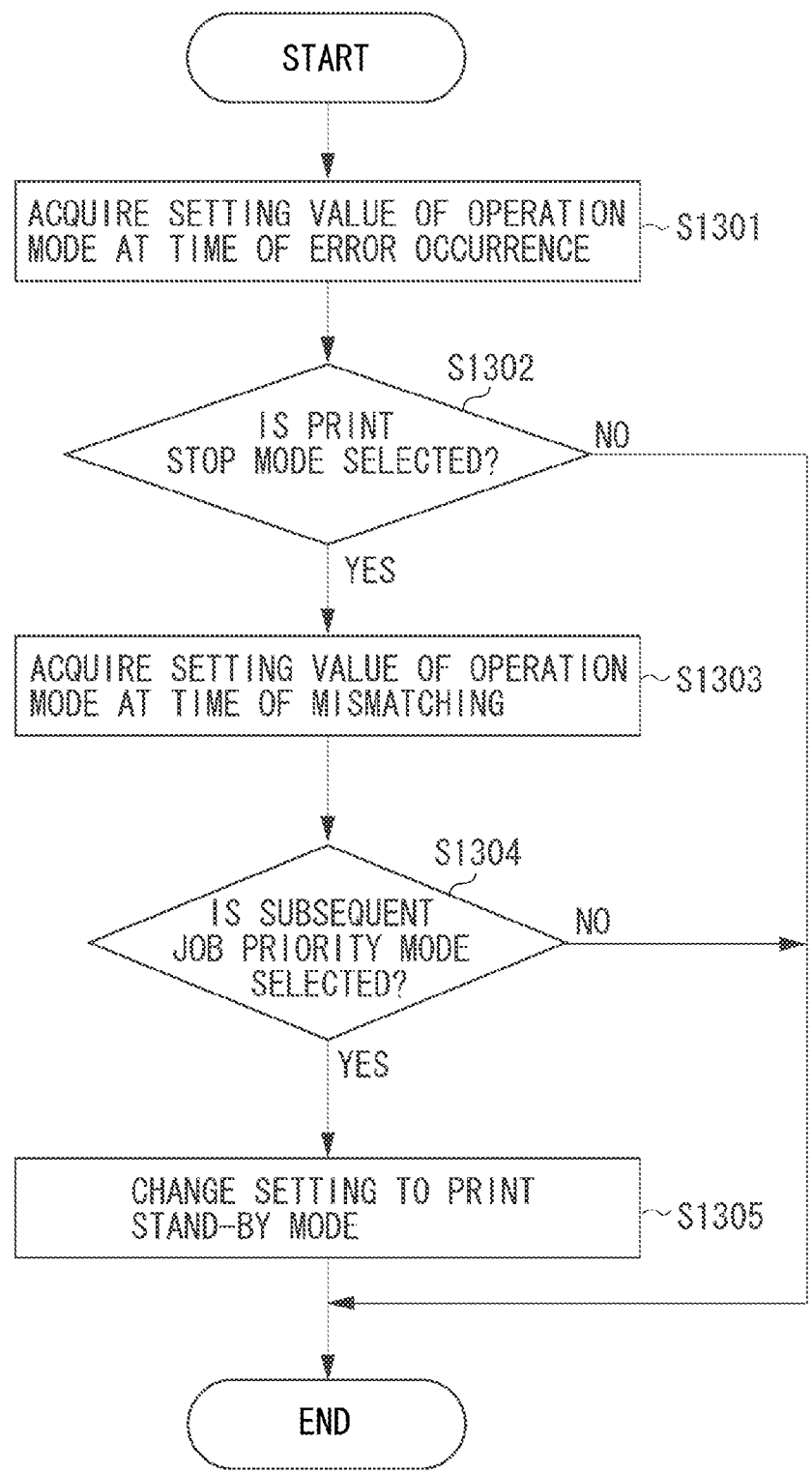
FIG. 13 is a flowchart illustrating a control method of the printing apparatus according to the present exemplary embodiment.

FIG. 13 is a flowchart illustrating a control method of the printing apparatus 102 according to the present exemplary embodiment. The flowchart illustrates an example of the control processing of the printing system according to the present exemplary embodiment, relating to the setting of the operation mode in the error occurrence period and the setting of the operation mode in the mismatching period, each of which is an initial setting item of the printing apparatus 102. The print job processing unit 111 executes the processing according to a program stored in the storage unit 109 of the printing apparatus 102 to realize the flowchart.

When the processing for the printing system is started, in step S1301, the print job processing unit 111 acquires a setting value of the operation mode of the printing apparatus 102 in the error occurrence period by reading the initial setting information of the printing apparatus 102 stored in the storage unit 109. The setting value of the operation mode in the error occurrence period is either the print stop mode or the print continue mode described in FIG. 9. The print stop mode is an operation mode for stopping the processing of the subsequent print job in a case where the processing of one print job is cancelled for some reason in the course of the processing of that print job. On the other hand, the print continue mode is an operation mode for continuing the processing of the subsequent print job in a case where the processing of one print job is cancelled for some reason in the course of the processing of that print job.

Next, in step S1302, the print job processing unit 111 determines whether the setting value of the operation mode in the error occurrence period is the print stop mode for stopping the processing of the subsequent print job.

In a case where the print job processing unit 111 determines that the operation mode is the print stop mode (YES in step S1302), the processing proceeds to step S1303. In step S1303, the print job processing unit 111 acquires the setting value of the operation mode for the printing apparatus 102 in the mismatching period by reading the initial setting information of the printing apparatus 102 stored in the storage unit 109. Herein, the setting value of the operation mode in the mismatching period is either the subsequent job priority mode or the print stand-by mode described in FIG. 10. The subsequent job priority mode is an operation mode for executing a subsequent print job in advance of a preceding print job by cancelling the preceding print job without waiting for the solving of shortage of resources in a case where mismatching of the print job arises because of a shortage of resources.

On the other hand, the print stand-by mode is an operation mode for continuously waiting for the solving of shortage of resources without cancelling the print job in a case where the mismatching of the print job arises because of a shortage of resources.

Next, in step S1302, if the print job processing unit 111 determines that the operation mode is not the print stop mode (NO in step S1302), the print job processing unit 111 ends the processing of the printing system.

In step S1304 following step S1303, the print job processing unit 111 determines whether the setting value of the operation mode in the mismatching period is the subsequent job priority mode for executing the subsequent print job in advance of the preceding print job.

If the print job processing unit 111 determines that the operation mode is the subsequent job priority mode (YES in step 1304), the processing proceeds to step S1305. In step S1305, the print job processing unit 111 sets the setting value of the operation mode in the mismatching period to the print stand-by mode for continuously waiting for the solving of the shortage of resources, and ends the processing of the printing system. As described above, in a case where the print stop mode is previously set as the operation mode in the error occurrence period of the printing apparatus 102, the operation mode in the mismatching period is controlled to be always the print stand-by mode.

On the other hand, if the print job processing unit 111 determines that the operation mode is not the subsequent job priority mode (NO in step S1304), the print job processing unit 111 ends the processing of the printing system.

Finally, according to the present exemplary embodiment in addition to the first exemplary embodiment, it is possible to provide a printing system capable of satisfying the requirement thereof to a maximum extent according to various usage modes of the operator who uses the printing system.

Subsequently, a third exemplary embodiment will be described in detail. In the present exemplary embodiment, only differences between the first and the second exemplary embodiments and the present exemplary embodiment will be described while descriptions common to the first and the second exemplary embodiments will be omitted.

The usage of the printing apparatus 102 may vary depending on how the operator inputs the print job. As one usage of the printing apparatus 102, as described in the first exemplary embodiment, there may be a case where the operator executes printing by combining a plurality of print jobs and acquires one printing outcome by consolidating the printing outputs thereof. In this case, the printing apparatus 102 has to accomplish the printing processing and outputs thereof according to the order of the print jobs instructed by the operator. On the other hand, as another usage of the printing apparatus 102, conventionally, there has been a case where the operator does not necessarily follow the order of the input print jobs but places priority on processing the print jobs as much as possible.

In this case, because the printing apparatus 102 regards the operation as a valid cancellation when one print job is cancelled, the print job comes into a normal ending state, so that the printing processing will proceed to a next print job in a case where there is another print job which follows thereafter. As described above, because the usage of the printing apparatus 102 may vary depending on how the operator inputs the print job, the printing system is not flexible if the usage thereof is limited to either the former case or the latter case.

As described in the second exemplary embodiment, as the operation mode in the initial setting of the printing apparatus 102, the printing apparatus 102 includes the print stop mode for stopping the processing of the subsequent print job in a case where the processing of a print job is cancelled for some reason in the course of the processing of that print job. On the other hand, as another operation mode in the initial setting of the printing apparatus 102, the printing apparatus 102 includes the print continue mode for continuing the processing of the subsequent print job in a case where the processing of a print job is cancelled for some reason in the course of the processing of that print job.

The above operation modes are specified as default operation modes of the printing apparatus 102 in the initial setting of the printing apparatus 102, so that the printing apparatus 102 operates according to any of these operation modes set thereto. As described above, the usage of the printing apparatus 102 may vary depending on the print job input by the operator. Therefore, the printing system is not flexible when the usage thereof is limited to either the former case or the latter case even if the initial setting value of the printing apparatus 102 can be switched.

Therefore, in the present exemplary embodiment, as the operation mode of the printing apparatus 102, the printing apparatus 102 includes the print stop mode for stopping the processing of the subsequent print job in a case where the processing of one print job is cancelled for some reason in the course of the processing of that print job. On the other hand, as another operation mode for the printing apparatus 102, the printing apparatus 102 includes the print continue mode for continuing the processing of the subsequent print job in a case where the processing of a print job is cancelled for some reason in the course of the processing of that print job. Then, these operation modes are specified as the printing attributes included in the print job, so that the printing apparatus 102 operates according to any of these operation modes specified by the print job. In other words, for example, the printing apparatus 102 includes the print stop mode and the print continue mode, and the PDL of the print job includes a PDL command for specifying any of these operation modes. In this case, the printing apparatus 102 processes the print job and the subsequent print job through the operation mode specified by the PDL command. In addition, as described in the second exemplary embodiment, any of the above modes are set as the default operation mode of the printing apparatus 102 by the initial setting of the printing apparatus 102. In a case where the print job does not include the printing attribute for specifying the operation mode, the printing apparatus 102 operates according to the default operation mode.

As described above, in addition to the first and the second exemplary embodiments, the present exemplary embodiment is directed to a printing system capable of satisfying the requirement thereof to a maximum extent according to various characteristics or properties of the print job input by the operator who uses the printing system.

Figure 14:
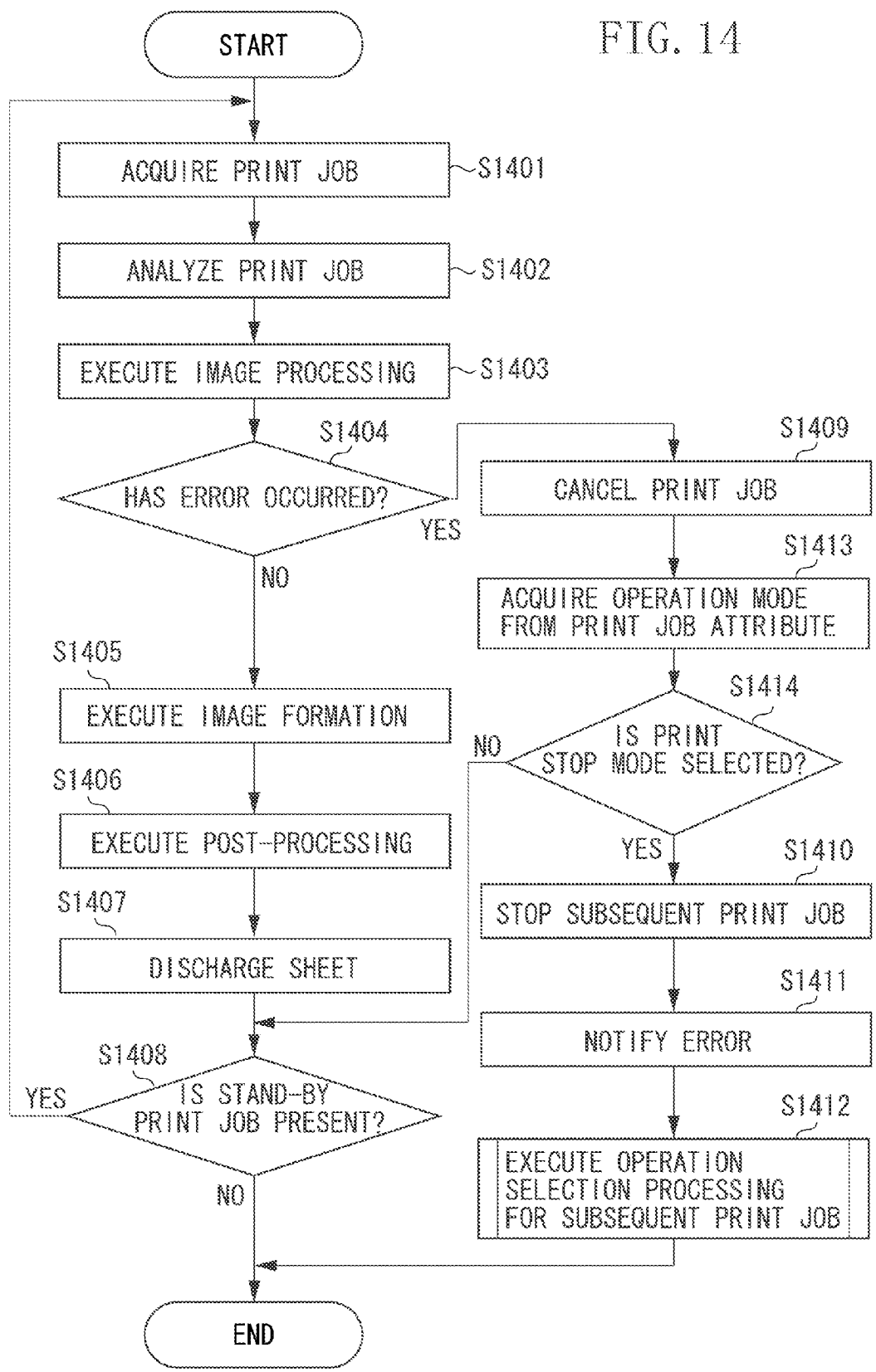
FIG. 14 is a flowchart illustrating a control method of the printing apparatus according to the present exemplary embodiment.

FIG. 14 is a flowchart illustrating a control method of the printing apparatus 102 according to the present exemplary embodiment. The flowchart illustrates the examples of the print job processing and the control processing of the printing system according to the present exemplary embodiment. The print job processing unit 111 executes the processing according to a program stored in the storage unit 109 of the printing apparatus 102 to realize the flowchart.

First, when the processing of the printing system is started, in step S1401, the print job processing unit 111 acquires a print job. Then, the print job processing unit 111 temporarily spools the acquired print job in the storage unit 109. For example, the print job may be PDL data in a PDL format sent from the client computer 101.

Next, in step S1402, the print job processing unit 111 analyzes the print job and acquires the information such as a type and print settings of the print job. Then, in step S1403, the print job processing unit 111 executes image processing on the print job and acquires the raster data subjected to RIP process. Next, in step S1404, the print job processing unit 111 determines whether any error has occurred in the course of the processing of the print job.

In a case where the print job processing unit 111 determines that some error has occurred in the course of the processing of the print job (YES in step S1404), the processing proceeds to step S1409. In step S1409, the print job processing unit 111 cancels the print job in which the error has occurred. On the other hand, in step S1404, in a case where the print job processing unit 111 determines that any error has not occurred in the course of the processing of the print job (NO in step S1404), the processing proceeds to step S1405.

In step S1413 that follows on from step S1409, the print job processing unit 111 acquires operation mode specification information of the printing apparatus 102, serving as one of the print job attributes, from the information acquired in step S1402. Herein, the operation mode specification information is either the print stop mode or the print continue mode described in FIG. 9. The print stop mode is an operation mode for stopping the processing of the subsequent print job in a case where the processing of one print job is cancelled for some reason in the course of the processing of that print job.

On the other hand, the print continue mode is an operation mode for continuing the processing of the subsequent print job in a case where the processing of one print job is cancelled for some reason in the course of the processing of that print job.

Next, in step S1414, the print job processing unit 111 determines whether the setting value of the operation mode is the print stop mode for stopping the processing of the subsequent print job.

If the print job processing unit 111 determines that the operation mode is the print stop mode (YES in step S1414), the processing proceeds to step S1410. In step S1410, the print job processing unit 111 stops all of the subsequent print jobs and shifts the printing apparatus 102 to a stand-by state.

On the other hand, in step S1414, if the print job processing unit 111 determines that the operation mode is not the print stop mode (NO in step S1414), the processing proceeds to step S1408.

In step S1411 that follows step S1410, the print job processing unit 111 notifies the operator of an error by displaying various kinds of information such as a message indicating that the print job is cancelled and the processing for the subsequent print job is stopped, the options of processing for the subsequent print job, and a message prompting the operator to select the processing.

Next, in step S1412, the print job processing unit 111 executes operation selection processing for the subsequent print job and ends the processing of the printing system. In addition, the processing of step S1412 will be described below in detail with reference to FIG. 15.

Returning back to step S1404, if the print job processing unit 111 determines that the error has not occurred (NO in step S1404), the processing proceeds to step S1405. Then, in step S1405, the print job processing unit 111 instructs the image forming unit 112 to execute image forming processing on a printing sheet by transferring the raster data of that print job to the image forming unit 112.

Next, in step S1406, the print job processing unit 111 provides an instruction for executing the post-processing specified by the print setting of the print job, so that the post-processing is executed on the printing sheet on which the image has been formed, and which is conveyed to any of the stacking units 206 to 208 via the sheet discharge unit 115.

Then, in step S1407, the print job processing unit 111 provides an instruction for discharging the post-processed printing sheet to any of the stacking units 206 to 208 as a final printing outcome.

Next, in step S1408, the print job processing unit 111 determines whether there is any stand-by print job waiting for the printing processing.

If the print job processing unit 111 determines that there is a stand-by print job waiting for the printing processing (YES in step S1408), the processing returns to step S1401. On the other hand, in step S1408, if the print job processing unit 111 determines that there is no stand-by print job waiting for the printing processing (NO in step S1408), the print job processing unit 111 ends the processing of the printing system.

Figure 15:
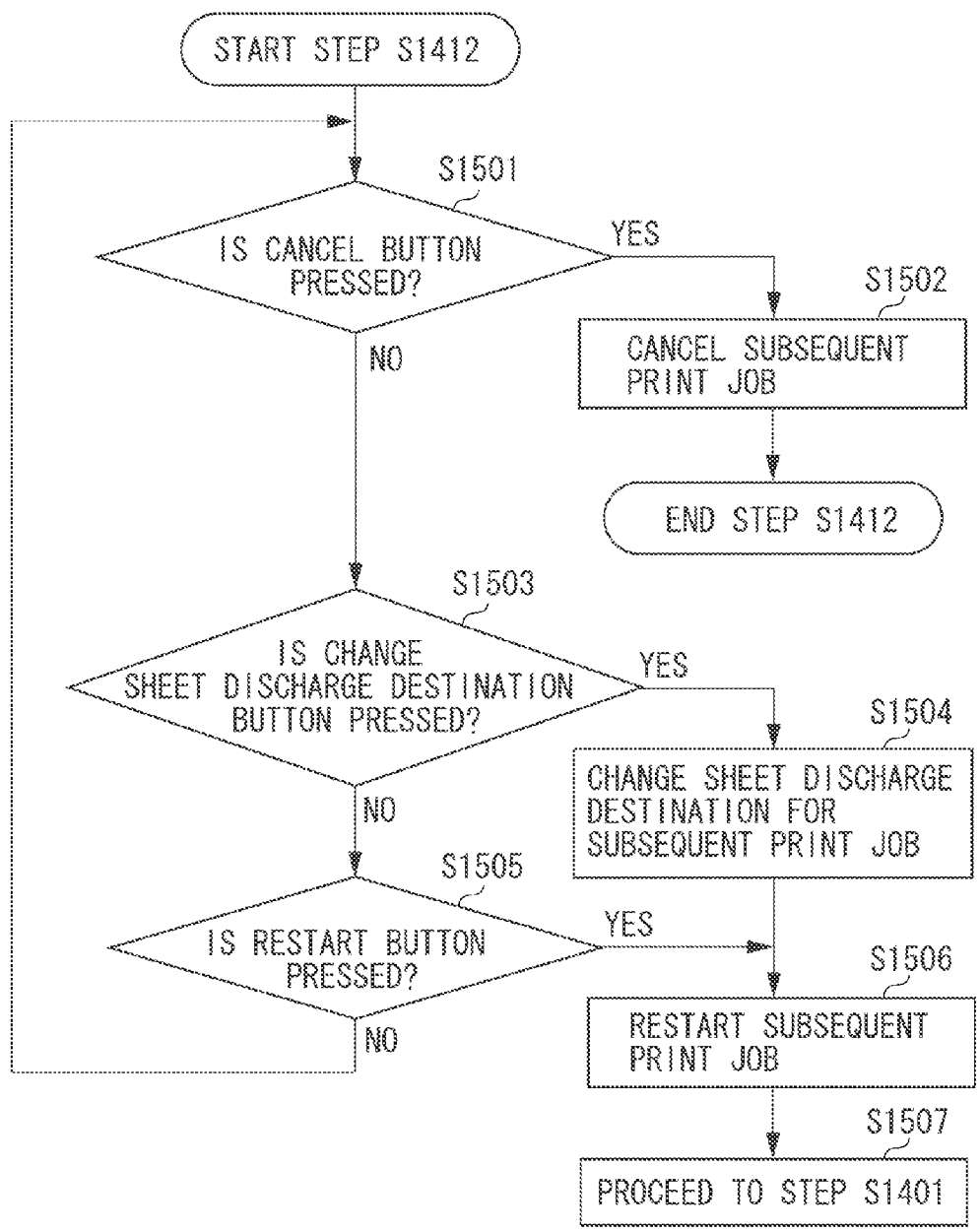
FIG. 15 is a flowchart illustrating a control method of the printing apparatus according to the present exemplary embodiment.

FIG. 15 is a flowchart illustrating a control method of the printing apparatus 102 according to the present exemplary embodiment. The flowchart illustrates detailed examples of the processing described in step S1412 of FIG. 14, corresponding to the examples of the print job processing and the control processing of the printing system according to the present exemplary embodiment. The print job processing unit 111 executes the processing according to a program stored in the storage unit 109 of the printing apparatus 102 to realize the flowchart.

When the processing of step S1412 is started, in step S1501, the print job processing unit 111 determines whether the cancel button 607 that is displayed on the operation unit 113 is pressed by the user.

In step S1501, if the print job processing unit 111 determines that the cancel button 607 is not pressed by the user (NO in step S1501), the processing proceeds to step S1503. In step S1503, the print job processing unit 111 determines whether the sheet discharge destination change button 609 that is displayed on the operation unit 113 is pressed by the user.

On the other hand, in step S1501, if the print job processing unit 111 determines that the cancel button 607 is pressed (YES in step S1501), the processing proceeds to step S1502. In step S1503, if the print job processing unit 111 determines that the sheet discharge destination change button 609 is pressed (YES in step S1503), the processing proceeds to step S1504. In step S1504, the print job processing unit 111 changes the stacking tray for discharging the subsequent print job, and advances the processing to step S1506.

On the other hand, in step S1503, if the print job processing unit 111 determines that the sheet discharge destination change button 609 is not pressed (NO in step S1503), the processing proceeds to step S1505. In step S1505, the print job processing unit 111 determines whether the restart button 608 that is displayed on the operation unit 113 is pressed.

If the print job processing unit 111 determines that the restart button 608 is pressed (YES in step S1505), the processing proceeds to step S1506. In step S1506, the print job processing unit 111 cancels the stand-by state of the printing apparatus 102 and restarts the processing of the subsequent stand-by print job. Then, in step S1507, the print job processing unit 111 advances the processing to step S1401.

Returning to step S1505, if the print job processing unit 111 determines that the restart button 608 is not pressed (NO in step S1505), the processing returns to step S1501, so that the state is the same as the state where the stand-by button 610 displayed on the operation unit 113 is pressed.

Returning to step S1501, if the print job processing unit 111 determines that the cancel button 607 is pressed (YES in step S1501), the processing proceeds to step S1502. In step S1502, the print job processing unit 111 cancels all of the subsequent jobs and ends the processing of step S1412.

Finally, in addition to the first and the second exemplary embodiments, according to the present exemplary embodiment, it is possible to provide a printing system capable of satisfying the requirement thereof to a maximum extent according to various characteristics or properties of the print job that is input by the operator who uses the printing system.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-161459 filed Aug. 2, 2013, which is hereby incorporated by reference herein in its entirety.

What is claimed is:

1. A printing apparatus comprising:
a receiving unit configured to receive a job and a subsequent job from an external device, the job including a command for determining, in a case where an error has occurred in the job, whether to process the subsequent job prior to the job or not to process the subsequent job prior to the job, the command being set by the external device;
a processing unit configured to process the job and then the subsequent job received by the receiving unit;
a stopping unit configured to stop processing of the job in the case where the error has occurred in the job; and
a controlling unit configured to control, after processing of the job is stopped by the stopping unit, the processing unit to process the subsequent job prior to the job or not to process the subsequent job prior to the job, according to the command being set by the external device, included in the job,
wherein at least one of the receiving unit, the processing unit, the stopping unit, and the controlling unit is implemented by a processor and a memory.

2. The printing apparatus according to claim 1, further comprising:
a display unit configured to display, in the case where the error has occurred in the job and the command for not processing the subsequent job prior to the job is included in the job, a warning of the error which has occurred,
wherein the display unit is implemented by the processor and the memory.

3. The printing apparatus according to claim 1, further comprising:
an operation unit configured to receive from a user, in the case where the error has occurred in the job, an instruction for performing a specific processing for the subsequent job,
wherein the processing unit performs, based on the instruction received by the operation unit, the specific processing for the subsequent job.

4. The printing apparatus according to claim 3, wherein the specific processing includes a first processing for cancelling the subsequent job, a second processing for changing a discharge destination of a sheet on which an image is formed by the subsequent job, and a third processing for restarting the subsequent job.

5. The printing apparatus according to claim 1, further comprising:
a first setting unit configured to set whether to execute a print stop mode for stopping processing of the subsequent job, or a print continue mode for continuing processing of the subsequent job, in the case where the error has occurred in the job,
wherein the controlling unit controls the processing unit not to process the subsequent job in a case where the print stop mode is set by the first setting unit and the command is not included in the job, and controls the processing unit to process the subsequent job in a case where the print continue mode is set by the first setting unit and the command is not included in the job,
wherein the first setting unit is implemented by the processor and the memory.

6. The printing apparatus according to claim 5, further comprising:
a second setting unit configured to set whether to execute a subsequent job priority mode for prioritizing and performing the subsequent job by cancelling the job in-process, or a print stand-by mode for waiting without cancelling the job in-process in a case where the job cannot be processed by resources provided by an image forming unit,
wherein the controlling unit controls the processing unit to prioritize processing of the subsequent job by cancelling the job in-process in a case where the subsequent job priority mode is set by the second setting unit and the command is not included in the job, and controls the processing unit to wait the processing of the subsequent job without cancelling the job in-process in a case where the print stand-by mode is set by the second setting unit and the command is not included in the job,
wherein the second setting unit is implemented by the processor and the memory.

7. The printing apparatus according to claim 6, wherein the controlling unit controls the processing unit not to execute the subsequent job priority mode set by the second setting unit in the case where the print stop mode is set by the first setting unit.

8. The printing apparatus according to claim 6, wherein the resources include a sheet used for image formation, and developer used for image formation.

9. A control method for a printing apparatus comprising:
- receiving a job and a subsequent job from an external device, the job including a command for determining, in a case where an error has occurred in the job, whether to process the subsequent job prior to the job or not to process the subsequent job prior to the job, the command being set by the external device;
- processing the received job and then the received subsequent job;
- stopping processing of the job in the case where the error has occurred in the job; and
- determining, after processing of the job is stopped, whether to process the subsequent job prior to the job or not to process the subsequent job prior to the job, according to the command being set by the external device, included in the job.

10. A non-transitory computer-readable medium storing instructions that, when executed by a computer of a printing apparatus, cause the computer to perform operations comprising:
- receiving a job and a subsequent job from an external device, the job including a command for determining, in a case where an error has occurred in the job, whether to process the subsequent job prior to the job or not to process the subsequent job prior to the job, the command being set by the external device;
- processing the received job and then the received subsequent job;
- stopping processing of the job in the case where the error has occurred in the job; and
- determining, after processing of the job is stopped, whether to process the subsequent job prior to the job or not to process the subsequent job prior to the job, according to the command being set by the external device, included in the job.

* * * * *